(12) United States Patent  
Yi et al.

(10) Patent No.: US 11,013,054 B2  
(45) Date of Patent: May 18, 2021

(54) UE-ASSISTANCE TO SUPPORT MULTIPLE SYSTEMS BASED ON FREQUENCY BAND COMBINATIONS

(71) Applicant: Ofinno, LLC, Reston, VA (US)

(72) Inventors: Yunjung Yi, Vienna, VA (US); Esmael Hejazi Dinan, McLean, VA (US); Kyungmin Park, Vienna, VA (US); JinSook Ryu, Oakton, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 16/847,016

(22) Filed: Apr. 13, 2020

(65) Prior Publication Data

US 2020/0329523 A1 Oct. 15, 2020

Related U.S. Application Data

(60) Provisional application No. 62/833,207, filed on Apr. 12, 2019.

(51) Int. Cl.
*H04W 76/27* (2018.01)
*H04W 68/02* (2009.01)
(Continued)

(52) U.S. Cl.
CPC .......... *H04W 76/27* (2018.02); *H04W 48/20* (2013.01); *H04W 68/02* (2013.01);
(Continued)

(58) Field of Classification Search
CPC .............. H04W 36/00; H04W 36/005; H04W 36/0066; H04W 72/0406; H04W 72/0453;
(Continued)

(56) References Cited

U.S. PATENT DOCUMENTS 8,204,516 B2   6/2012   Hsu
8,412,195 B2 *  4/2013   Yuk et al. ................... 455/435.1
(Continued)

FOREIGN PATENT DOCUMENTS

EP   3149988   4/2017
EP   3149988   5/2019
(Continued)

OTHER PUBLICATIONS

"3GPP TS 22.173 V16.1.0 (Sep. 2018); Technical Specification; 3rd Generation Partnership Project; Technical Specification Group Services and System Aspects; IP Multimedia Core Network Subsystem (IMS) Multimedia Telephony Service and supplementary services;Stage 1 (Release 16);"
(Continued)

*Primary Examiner* — Meless N Zewdu
(74) *Attorney, Agent, or Firm* — David Grossman; Kavon Nasabzadeh; Philip Smith

(57) ABSTRACT

A wireless device sends a first radio resource control (RRC) message to a first base station. The first RRC message may indicate one or more first frequency band combinations that the wireless device is capable of communicating with the first base station. During an RRC connection with the first base station, a cell of a second base station for monitoring one or more downlink channels may be selected. One or more second frequency band combinations may be determined based on: one or more operating frequency bands of the cell; the one or more first frequency band combinations; and radio transceiver capability of the wireless device. During the RRC connection with the first base station, a second RRC message indicating the one or more second frequency band combinations may be transmitted to the first base station.

20 Claims, 27 Drawing Sheets

(51) Int. Cl.
*H04W 72/04* (2009.01)
*H04W 48/20* (2009.01)
*H04W 88/06* (2009.01)
*H04W 84/04* (2009.01)

(52) U.S. Cl.
CPC ..... *H04W 72/048* (2013.01); *H04W 72/0453* (2013.01); *H04W 84/042* (2013.01); *H04W 88/06* (2013.01)

(58) Field of Classification Search
CPC ... H04W 76/27; H04W 48/20; H04W 84/042; H04W 68/02; H04W 72/04; H04W 72/048; H04W 76/10; H04W 76/04; H04W 60/06; H04W 76/34; H04W 76/00; H04W 76/15; H04W 76/11; H04W 72/02; H04W 88/02; H04W 88/10; H04W 88/023; H04W 88/18; H04W 88/00; H04W 88/08; H04W 76/30; H04W 74/00; H04W 74/002; H04W 74/006; H04W 74/02; H04W 74/004; H04W 68/023; H04W 68/12; H04W 68/00; H04W 76/20; H04W 76/25; H04W 36/0027; H04W 76/16; H04W 88/06
See application file for complete search history.

(56) References Cited

U.S. PATENT DOCUMENTS

| | | | |
|---|---|---|---|
| 8,737,348 B2* | 5/2014 | Oh | 370/330 |
| 8,892,098 B2* | 11/2014 | Choi | H04W 76/025 |
| 9,088,985 B2* | 7/2015 | Kishiyama et al. | H04W 72/048 |
| 9,237,593 B2 | 1/2016 | Kirveskoski | |
| 9,848,340 B2* | 12/2017 | Kazmi et al. | H04W 24/02 |
| 10,284,999 B2* | 5/2019 | Kumar et al. | H04W 4/02 |
| 10,701,751 B2* | 6/2020 | Henttonen et al. | H04W 76/15 |
| 2014/0194120 A1* | 7/2014 | Wang et al. | 455/436 |
| 2015/0334637 A1* | 11/2015 | Kim et al. | H04W 48/12 |
| 2017/0048647 A1* | 2/2017 | Jung et al. | H04W 4/005 |
| 2018/0076872 A1* | 3/2018 | Li et al. | H04B 7/0626 |

FOREIGN PATENT DOCUMENTS

| | | |
|---|---|---|
| ES | 2684223 | 10/2018 |
| WO | 2013188545 | 12/2013 |
| WO | 2015180779 | 12/2015 |

OTHER PUBLICATIONS

3GPP TS 23501 V15A.0 (Dec. 2018); Technical Specification; 3rd Generation Partnership Project; Technical Specification Group Services and System Aspects; System Architecture for the 5G System; Stage 2; (Release 15).
3GPP TS 24301 V155.0 (Dec. 2018); Technical Specification; 3rd Generation Partnership Project; Technical Specification Group Core Network and Terminals; Non-Access-Stratum (NAS) protocol for Evolved Packet System (EPS); Stage 3 (Release 15).
3GPP Ts 24501 V15.2.1 (Jan. 2019); Technical Specification; 3rd Generation Partnership Project; Technical Specification Group Core Network and Terminals; Non-Access-Stratum (NAS) protocol for 5G System (5GS); Stage 3; (Release 15).
3GPP TS 29.244 V15A.0 (Dec. 2018); Technical Specification; 3rd Generation Partnership Project; Technical Specification Group Core Network and Terminals; Interface between the Control Plane and the User Plane Nodes; Stage 3; (Release 15).
3GPP TS 29.274 V15.6.0 (Dec. 2018); Technical Specification; 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 15).
3GPP TS 29518 V15.2.0 (Dec. 2018); Technical Specification; 3rd Generation Partnership Project; Technical Specification Group Core Network and Terminals; 5G System; Access and Mobility Management Services; Stage 3; (Release 15).
3GPP Ts 38.101-4 V15.0.0 (Dec. 2018); Technical Specification; 3rd Generation Partnership Project; Technical Specification Group Radio Access Network; NR; User Equipment (UE) radio transmission and reception;; Part 4: Performance requirements.
3GPP TS 38.133 V15.4.0 (Dec. 2018); Technical Specification 3rd Generation Partnership Project; Technical Specification Group Radio Access Network; NR;; Requirements for support of radio resource management.
"3GPP TS 38.213 V15.4.0 (Dec. 2018); Technical Specification; 3rd Generation Partnership Project; Technical Specification Group Radio Access Network; NR;Physical layer procedures for control (Release 15); / /".
3GPP TS 38.304 V15.2.0 (Dec. 2018); Technical Specification; 3rd Generation Partnership Project; Technical Specification Group Radio Access Network; NR; User Equipment (UE) procedures in Idle mode and RRC Inactive state; (Release 15).
3GPP TS 38.306 V15.4.0 (Dec. 2018); Technical Specification; 3rd Generation Partnership Project; Technical Specification Group Radio Access Network; NR; User Equipment (UE) radio access capabilities; (Release 15).
3GPP TS 38.321 V15.4.0 (Dec. 2018); Technical Specification; 3rd Generation Partnership Project; Technical Specification Group Radio Access Network; NR; Medium Access Control (MAC) protocol specification; (Release 15).
3GPP TS 38.331 V15.4.0 (Dec. 2018); Technical Specification; 3rd Generation Partnership Project; Technical Specification Group Radio Access Network; NR; Radio Resource Control (RRC) protocol specification; (Release 15).
3GPP TS 38.413 V15.2.0 (Dec. 2018); Technical Specification; 3rd Generation Partnership Project; Technical Specification Group Radio Access Network; NG-RAN; NG Application Protocol (NGAP); (Release 15).
3GPP TS 38.415 V15.2.0 (Dec. 2018); Technical Specification; 3rd Generation Partnership Project; Technical Specification Group Radio Access Network; NG-RAN; PDU Session User Plane Protocol; (Release 15).
"C4-150097; 3GPP TSG CT4 Meeting #68; Sorrento, Italy; Feb. 2-6, 2015; CR-Form-v11.1; ; Change Request; ; ".
"R2-115375 Dual-Sim Dual-Standby UEs and their impact on the RAN; 3GPP TSG-RAN WG2 #75bisTdoc R2-115375 Zhuhai, China Oct. 10-14, 2011; ; Agenda Item:04.1; Source: Ericsson ; Title:Dual-SIM Dual-Standby UEs and their impact on the RAN;".
"S2-144682 was 4424 was3930_23401R13 VoLTE_PPD; SA WG2 Meeting #106; Nov. 17-21, 2014, San Francisco, California, USA(revision of S2-143930); CR-Form-v11.1; ; Change Request; ;".
"S2-164763_was3492_IMS_paging; SA WG2 Meeting #116-BIS; Aug. 29-Sep. 2, 2016, Sanya, P. R. China(revision of S2-163492); ; Source:Intel, Huawei; Title:IMS paging type differentiation for PS domain; Document for:Discussion / Approval;".
"S2-174243-pagingCollision_v8; SA WG2 Meeting #122; Jun. 26-30, 2017, San Jose Del Cabo , Mexico(was S2-17xxxx); ; Source:Qualcomm Incorporated, Oppo, China Unicorn, Vivo; Title:Avoidance of paging collisions to minimize outage of services; Document for:Discussion;".
"S2-1812346_23401_CR3484_PagingCause; SA WG2 Meeting #129-BIS; 6 Nov. 26-30, 2018, West Palm Beach, FL, US(revision of S2-181xxxx); ; CR-Form-v11.1; ; Change Request;".
"S2-1812349_23501_CR0729_PagingCause; SA WG2 Meeting #129-BIS; 9 Nov. 26-30, 2018, West Palm Beach, FL, US(revision of S2-181xxxx); ; CR-Form-v11.1; ; Change Request;".
"S2-1812350_23502_CR0858_PagingCause; SA WG2 Meeting #129-BIS; 0 Nov. 26-30, 2018, West Palm Beach, FL, US(revision of S2-181xxxx); ; CR-Form-v11.1; ; Change Request;".
"S2-181868-DP-paging cause-r2; SA WG2 Meeting #126; Feb. 26-Mar. 2. 2018, Montreal, Canada(was S2-18xxxx); ; Source:Qualcomm Incorporated, Intel; Title:Paging cause to the UE; Document for:Discussion/Approval;".

(56) References Cited

OTHER PUBLICATIONS

"S2-1900688_was00332_Updated_SID_FS_MUSIM; SA WG2 Meeting #130; 8 Jan. 21-25, 2019, Kochi, India(revision of S2-1900332); ; Source:Intel; Title:Revised SID: Study on system enablers for multi-SIM devices; Document for:Approval;".

"S2-1813349_was3346_was3342_WID_multiSIM; SA WG2 Meeting #129bis; 9 Nov. 26-30, 2018, West Palm Beach, USA(was S2-1813346); Source: Intel, Verizon, AT&T, Sony, Samsung, Charter Communications, China Mobile, Lenova, Motorola Mobility, NEC, vivo, OPPO, KPN, ETRI, InterDigital, Convida Wireless; Title:New SID: Study on system enablers for multi-SIM devices; Document for:Approval; Agenda Item:7.1;".

* cited by examiner

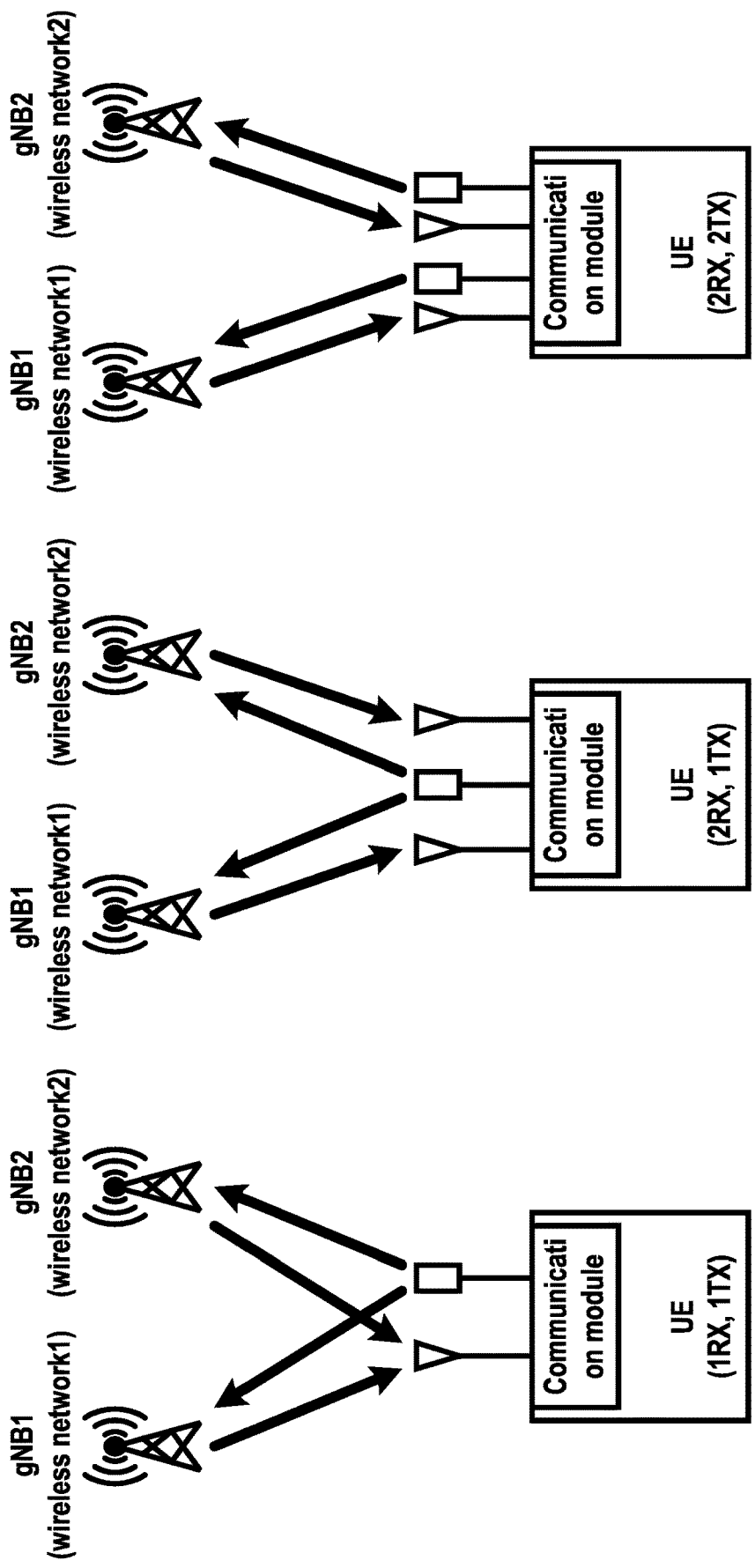
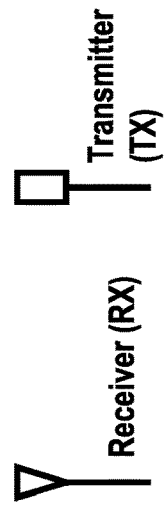
FIG. 18C
FIG. 18B
FIG. 18A

Send, to a 1st base station, a 1st RRC message indicating 1st frequency band combination(s) that the wireless device is capable of communicating with the 1st base station
2710

Select, during an RRC connection with the 1st base station, a cell of a 2nd base station for monitoring downlink channel(s)
2720

Determine 2nd frequency band combination(s) based on: operating frequency band(s) of the cell; the 1st frequency band combination(s); and radio transceiver capability of the wireless device
2730

Transmit, to the first base station during the RRC connection with the 1st base station, a 2nd RRC message indicating the o2nd frequency band combination(s)
2740

FIG. 27

UE-ASSISTANCE TO SUPPORT MULTIPLE SYSTEMS BASED ON FREQUENCY BAND COMBINATIONS

CROSS-REFERENCE TO RELATED APPLICATIONS

This application claims the benefit of U.S. Provisional Application No. 62/833,207, filed Apr. 12, 2019, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 18A illustrates an example diagram of a wireless device with different radio transceiver capabilities supporting multiple systems.

FIG. 18B illustrates an example diagram of a wireless device with different radio transceiver capabilities supporting multiple systems.

FIG. 18C illustrates an example diagram of a wireless device with different radio transceiver capabilities supporting multiple systems.

FIG. 27 is a flow diagram of an aspect of an example embodiment of the present disclosure.

DETAILED DESCRIPTION OF EMBODIMENTS

Figure 1:
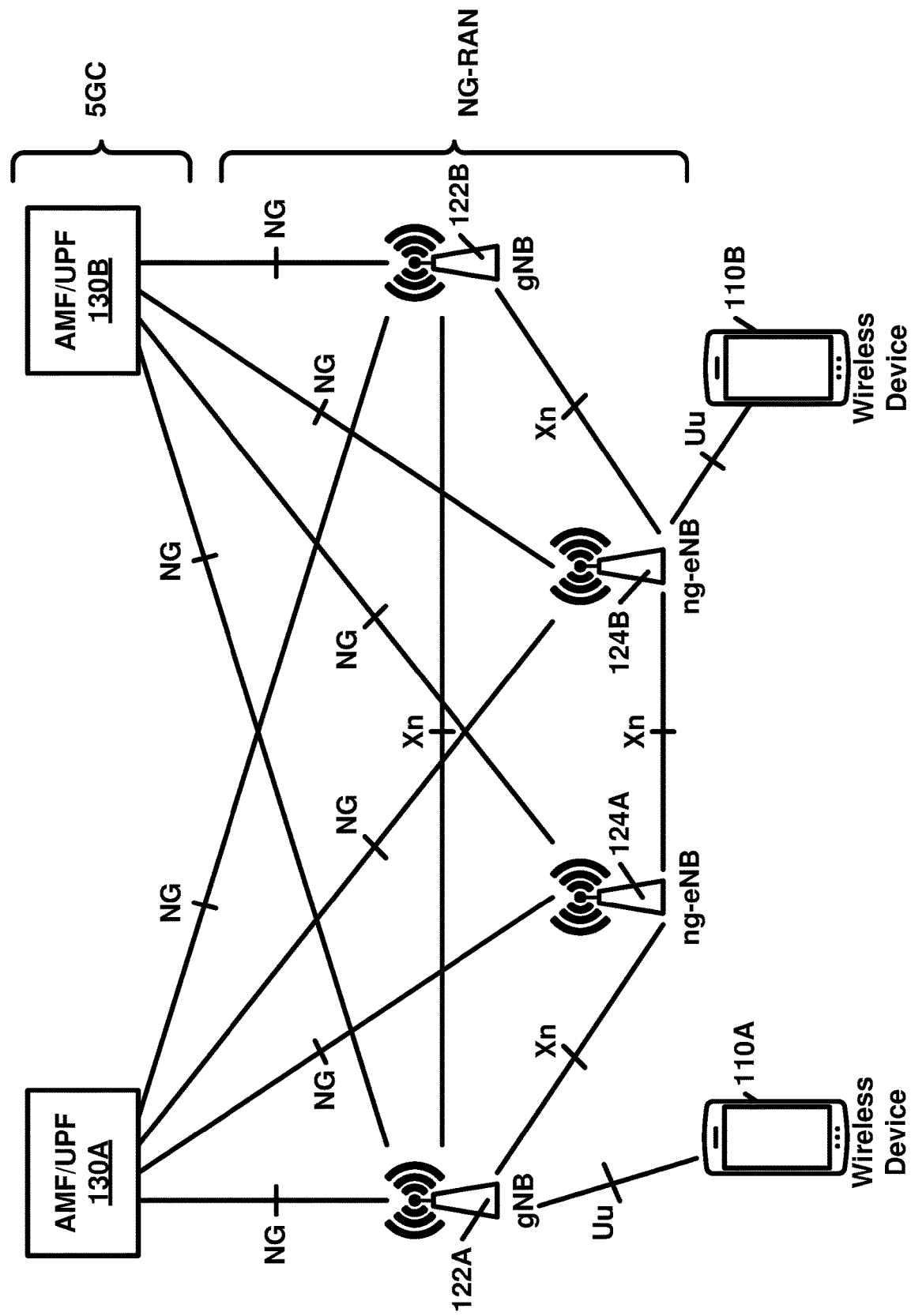
FIG. 1 is a diagram of an example RAN architecture as per an aspect of an embodiment of the present disclosure.

Example embodiments of the present disclosure enable operation of wireless communication systems. Embodiments of the technology disclosed herein may be employed in the technical field of multicarrier communication systems. More particularly, the embodiments of the technology disclosed herein may relate to radio access networks in multi-carrier communication systems.

The following Acronyms are used throughout the present disclosure:
3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control CHannel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic CHannel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel IDentifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank Indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 124A, 124B), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface. In this disclosure, wireless device 110A and 110B are structurally similar to wireless device 110. Base stations 120A and/or 120B may be structurally similarly to base station 120. Base station 120 may comprise at least one of a gNB (e.g. 122A and/or 122B), ng-eNB (e.g. 124A and/or 124B), and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide, for example, NG interface management, UE context management, UE mobility management, transport of NAS messages, paging, PDU session management, configuration transfer and/or warning message transmission, combinations thereof, and/or the like.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
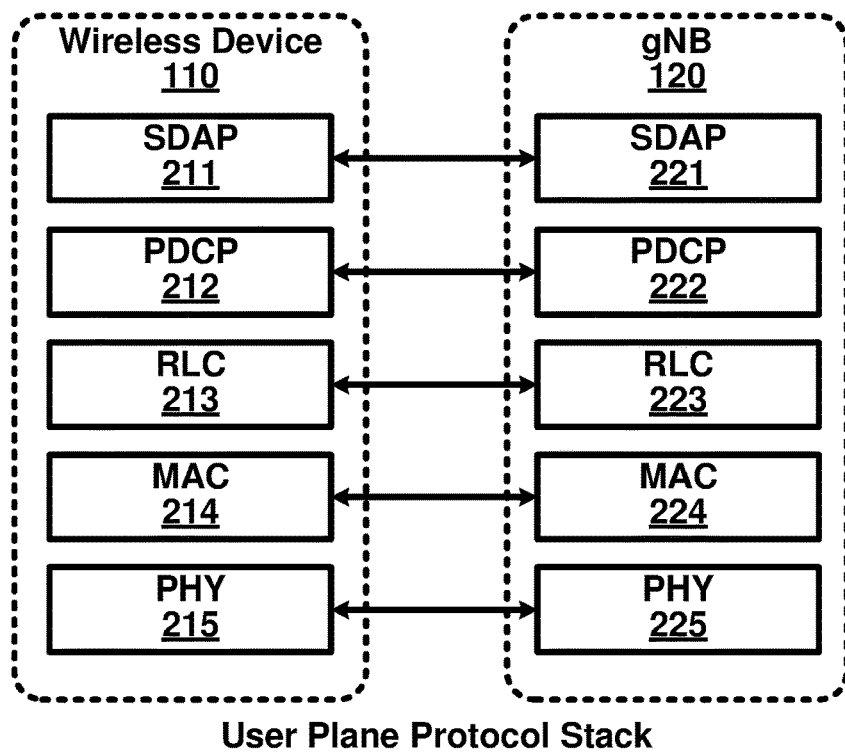
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TB s) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
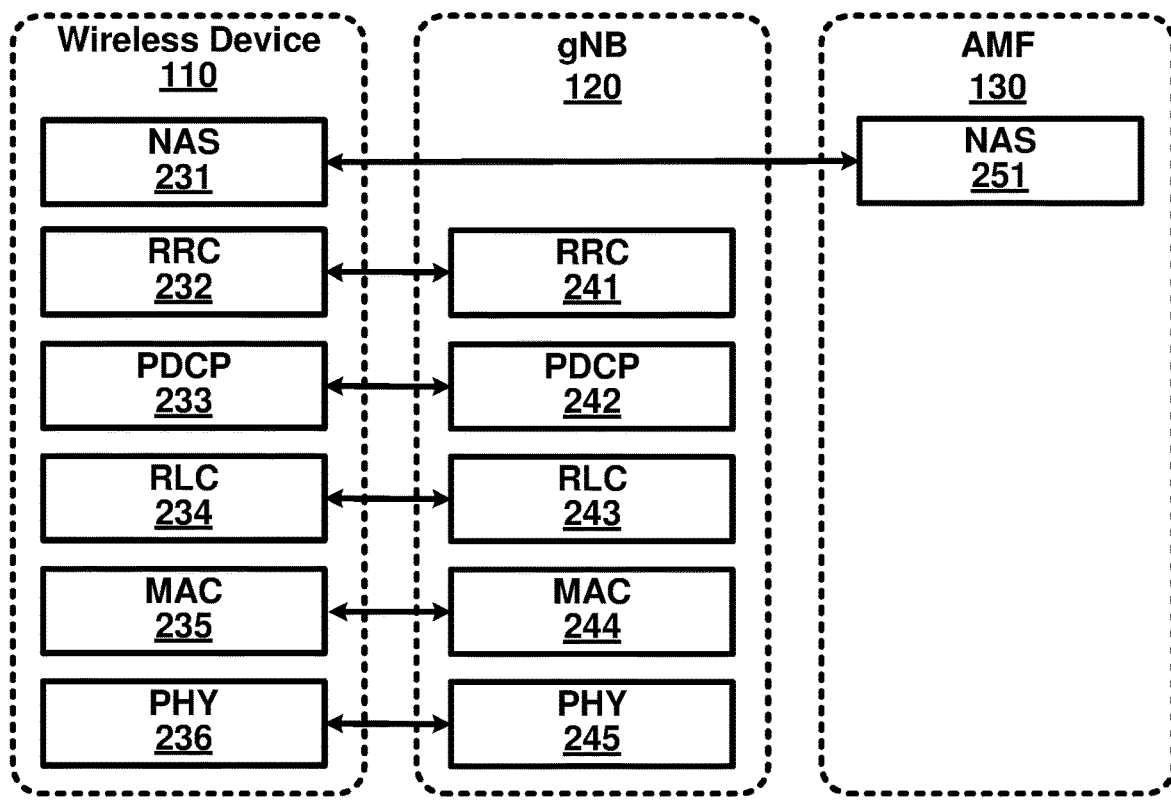
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
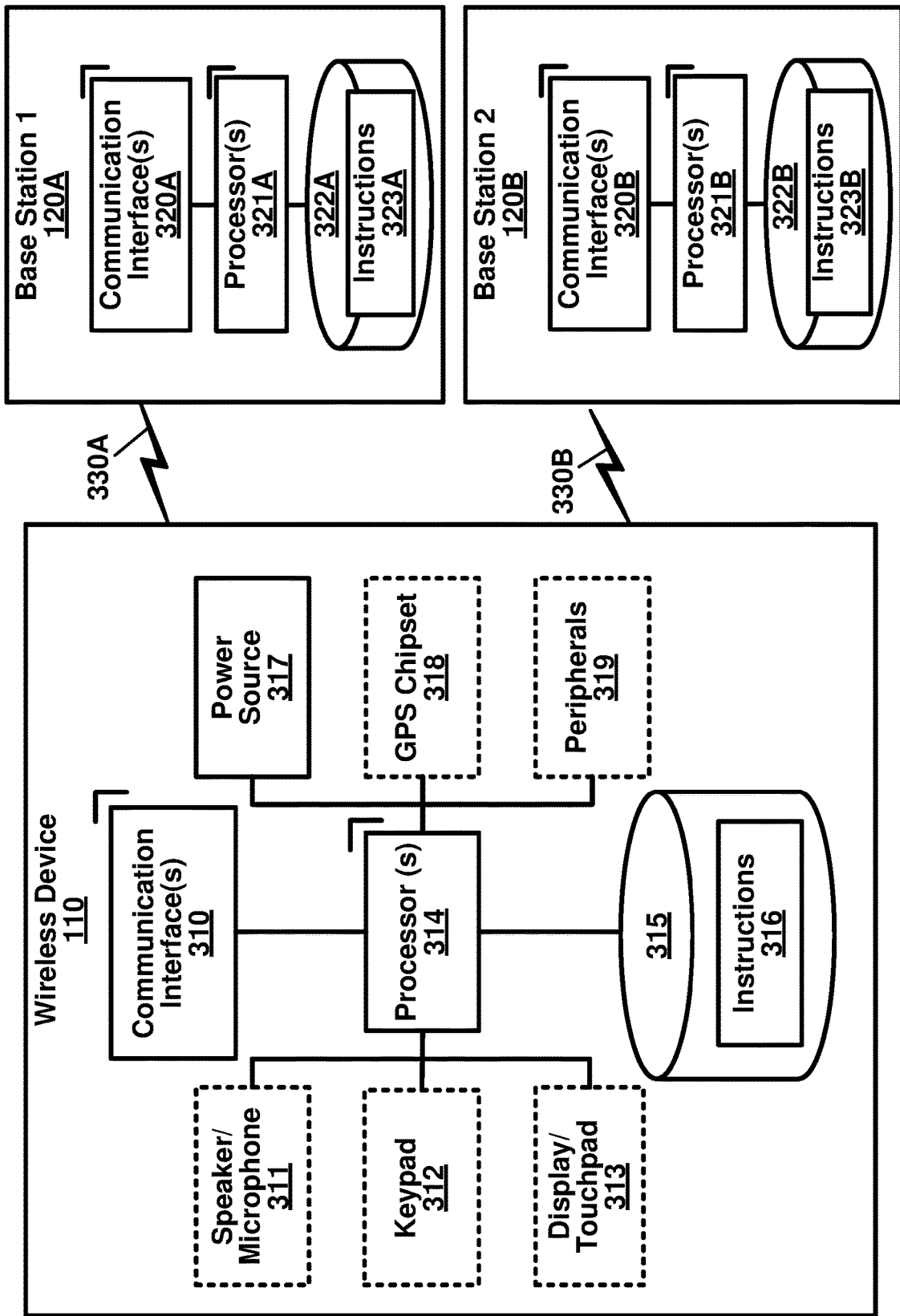
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called a UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG- RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to reestablish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

Figure 4A:
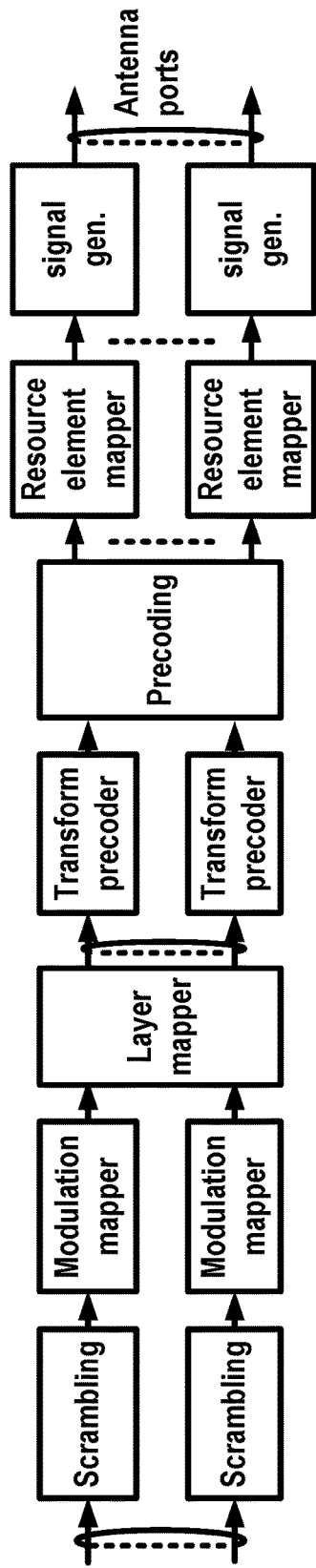
FIG. 4A, FIG. 4B, FIG. 4C and FIG. 4D are example diagrams for uplink and downlink signal transmission as per an aspect of an embodiment of the present disclosure.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

Figure 4B:
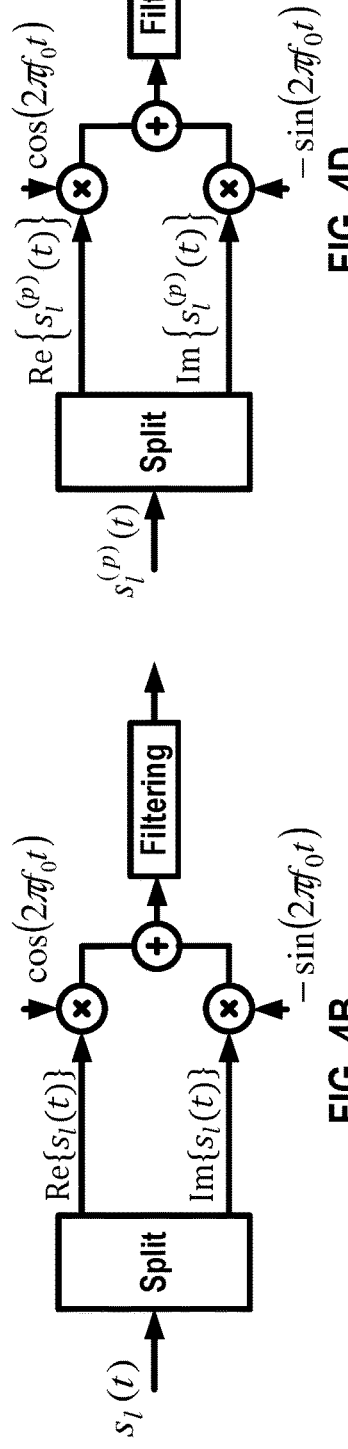

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

Figure 4D:
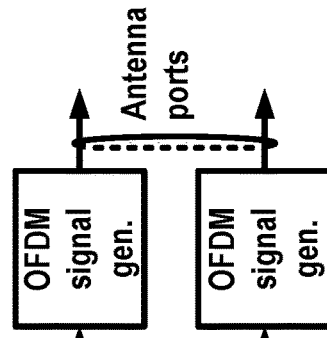
Figure 4C:
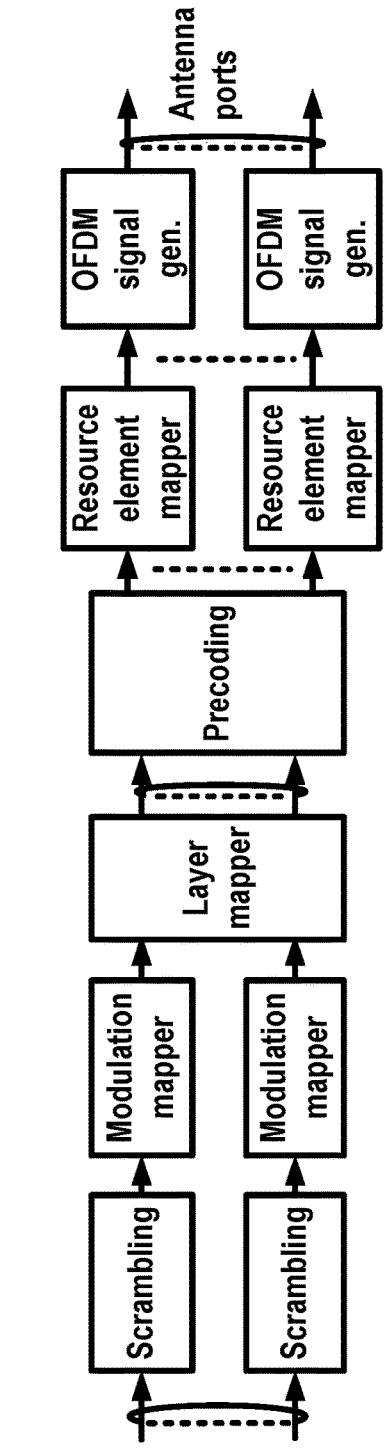

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
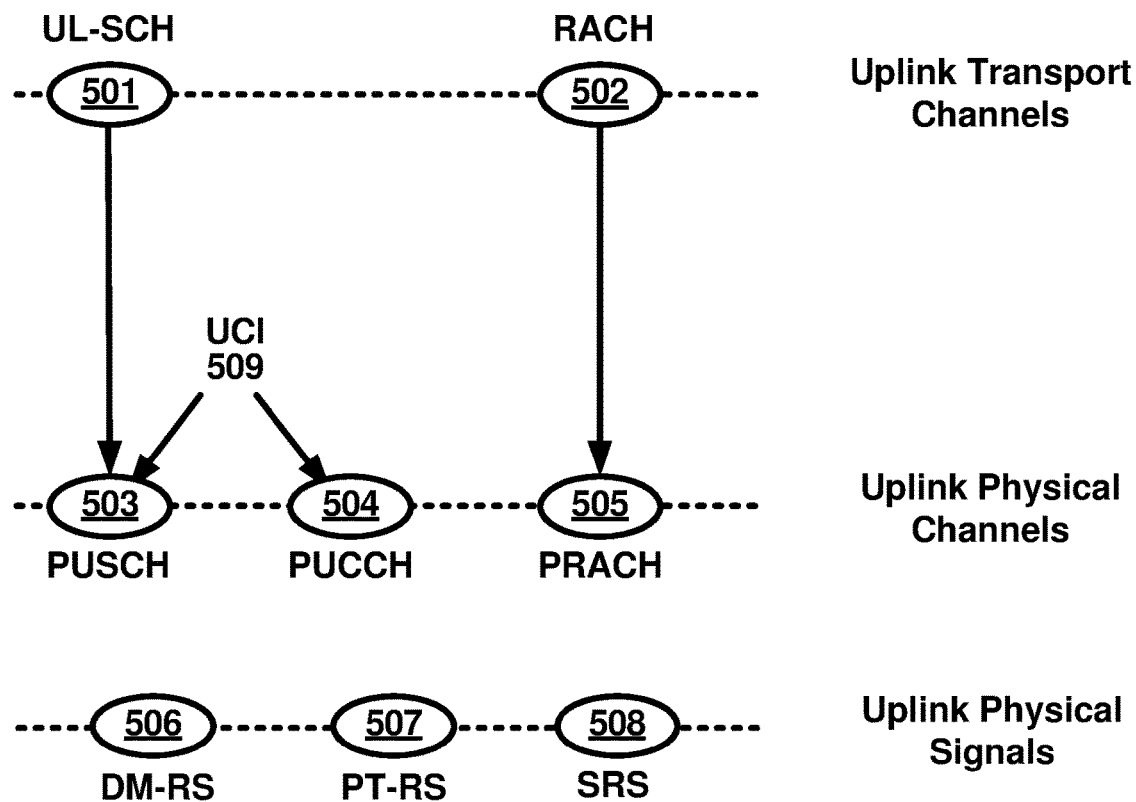
FIG. 5A is a diagram of an example uplink channel mapping and example uplink physical signals as per an aspect of an embodiment of the present disclosure.
Figure 5B:
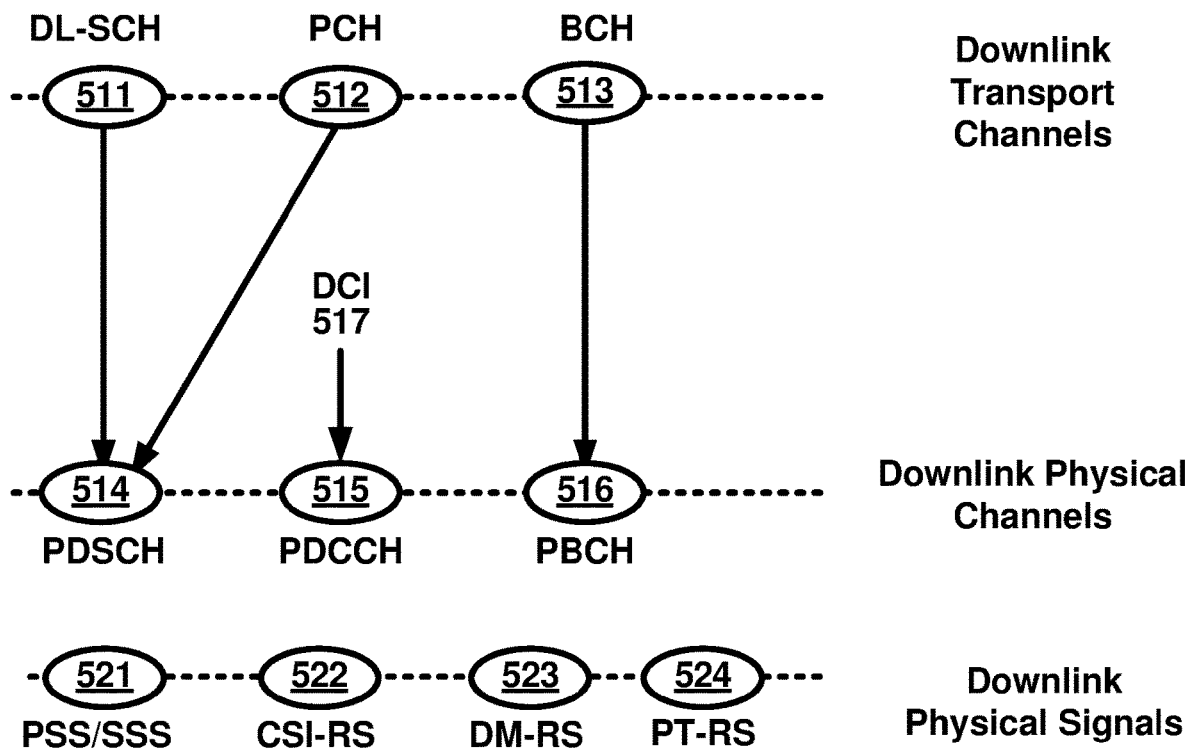
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on an RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on an RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
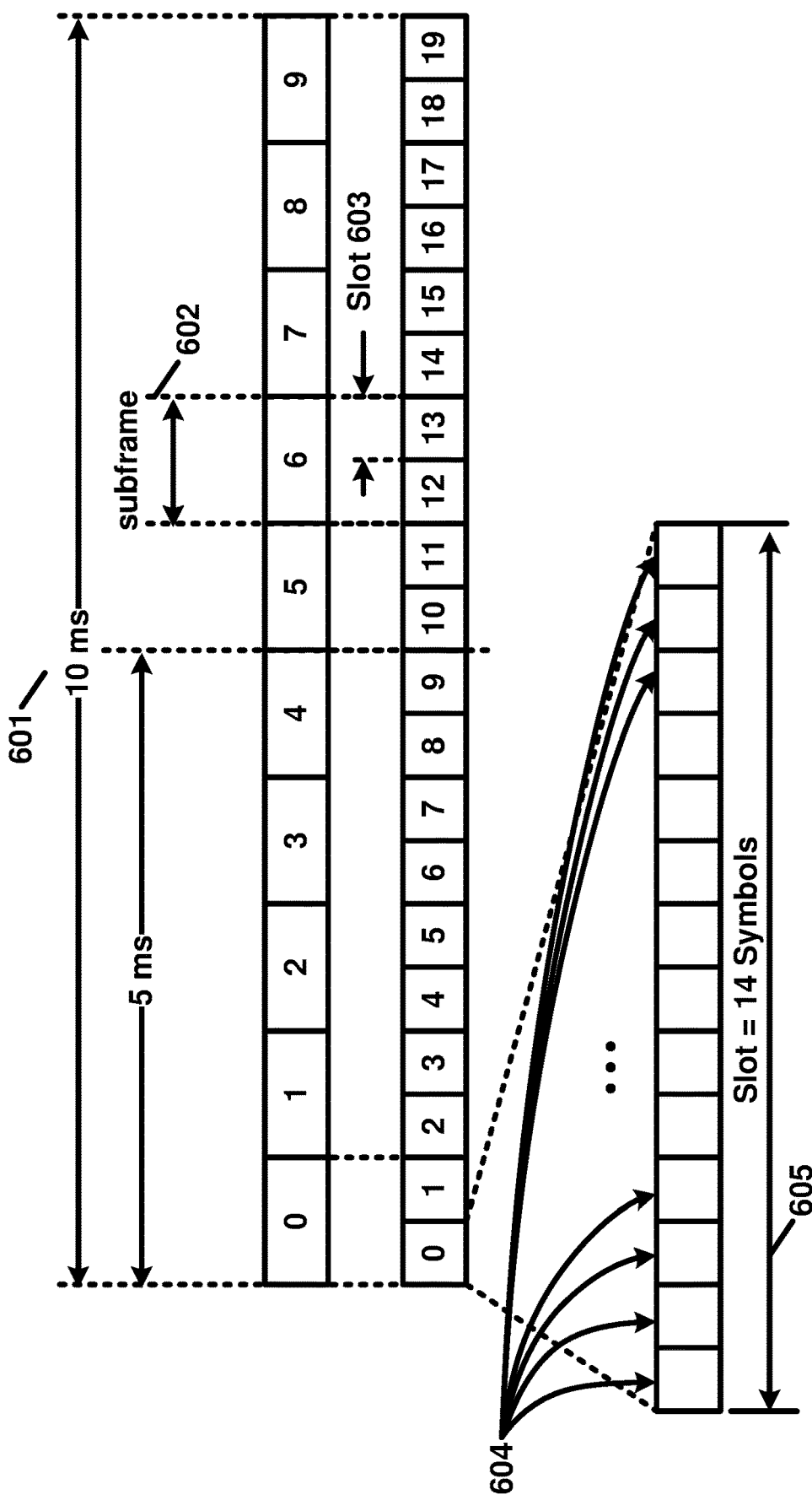
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
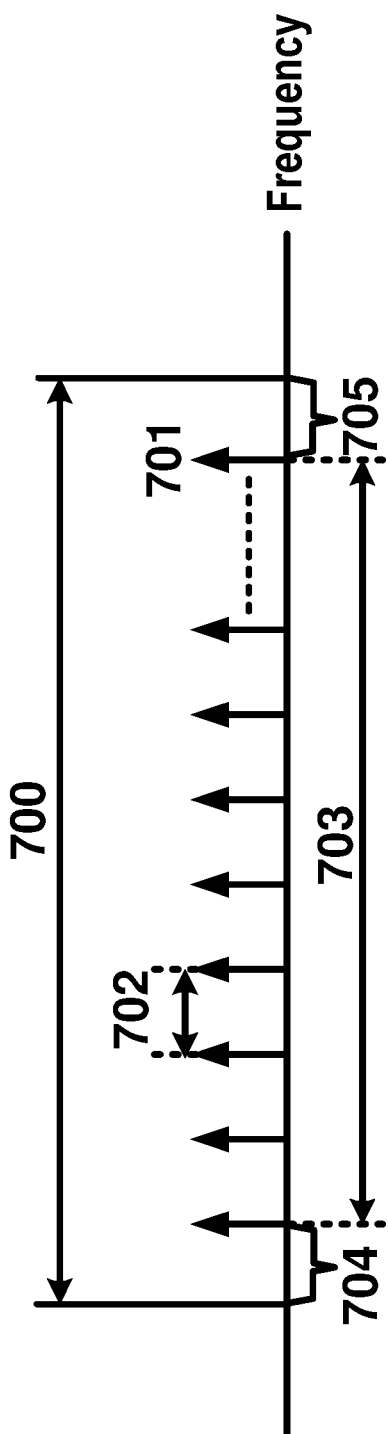
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
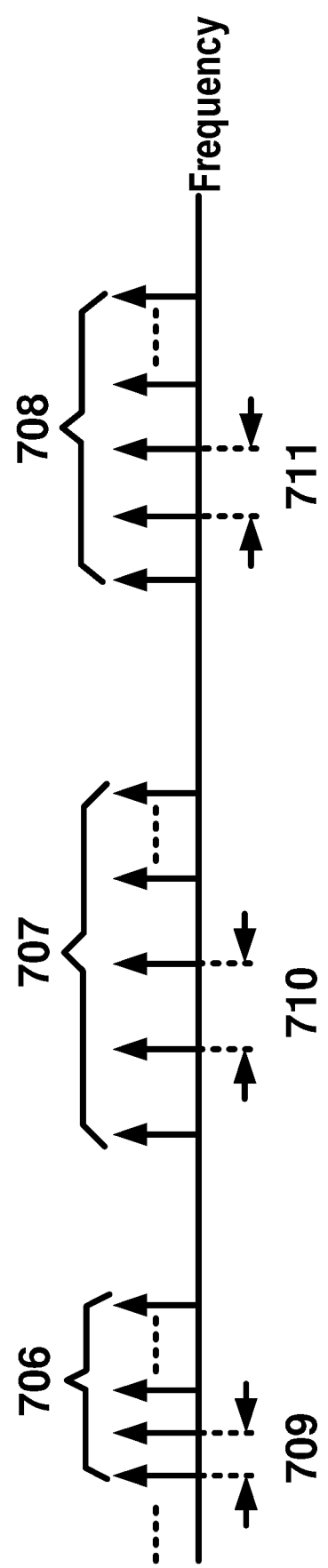

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
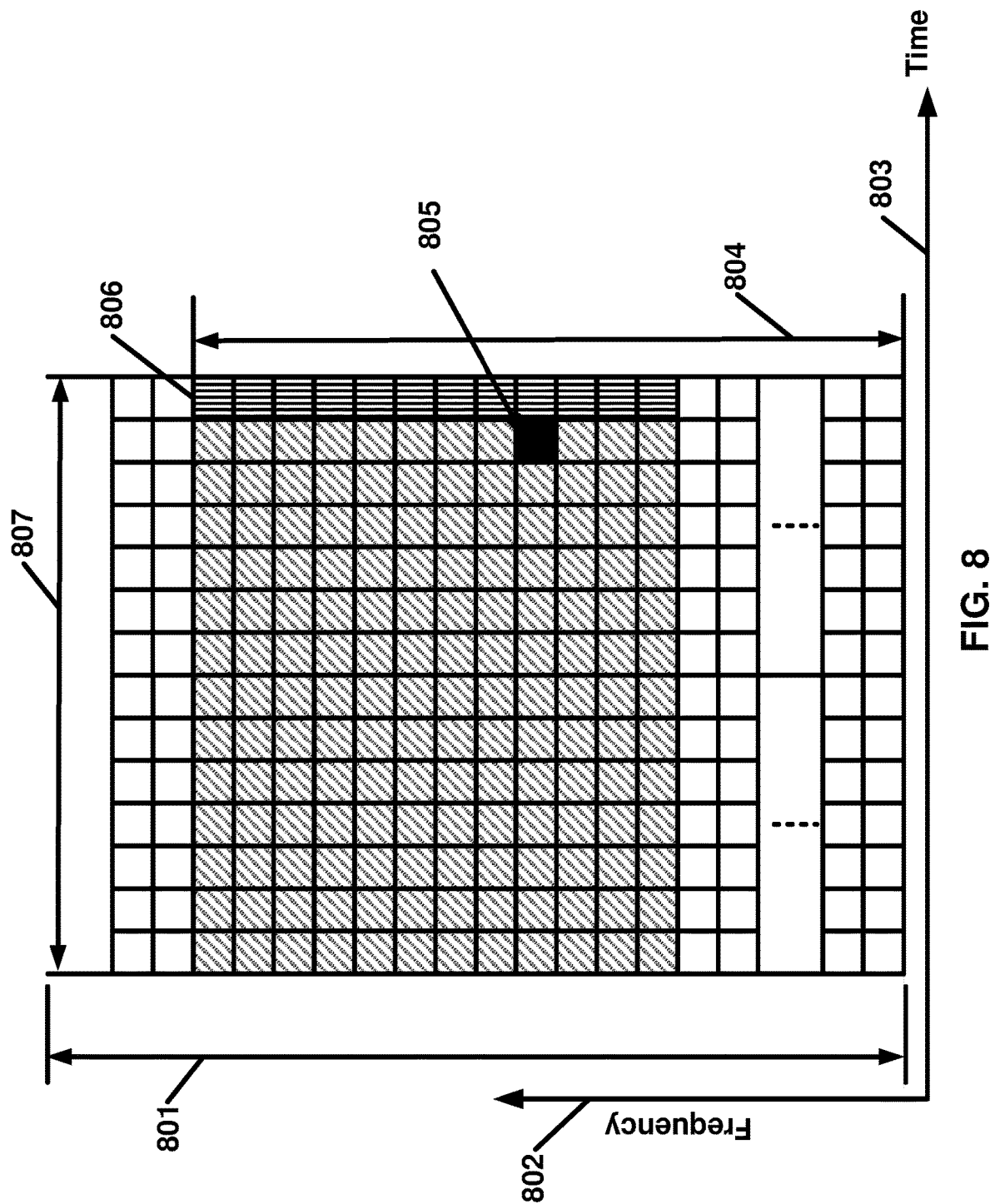
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: an RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message (s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCLed with the DM-RS antenna port(s). Different set of DM-RS antenna port(s) for a DL data channel may be indicated as QCL with different set of the RS antenna port(s).

Figure 9A:
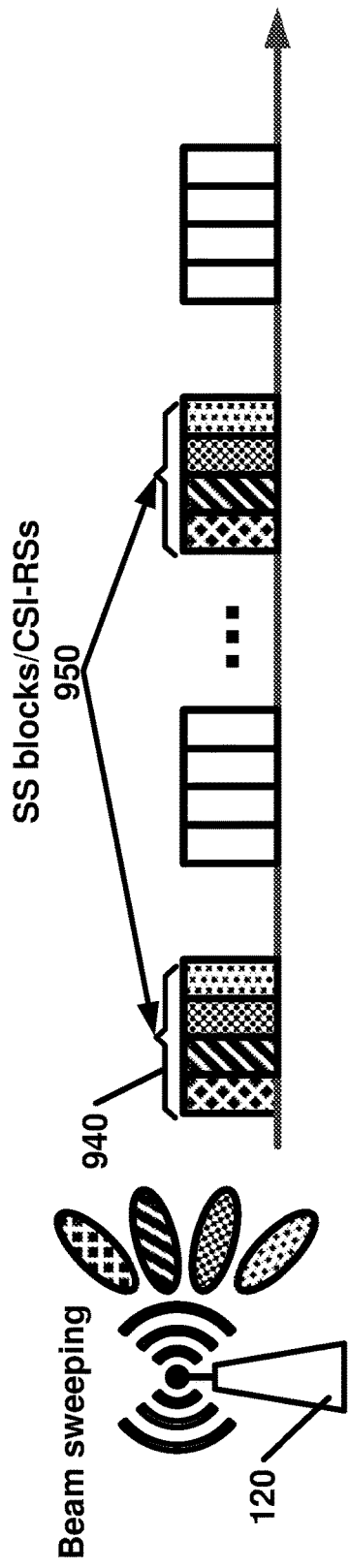
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
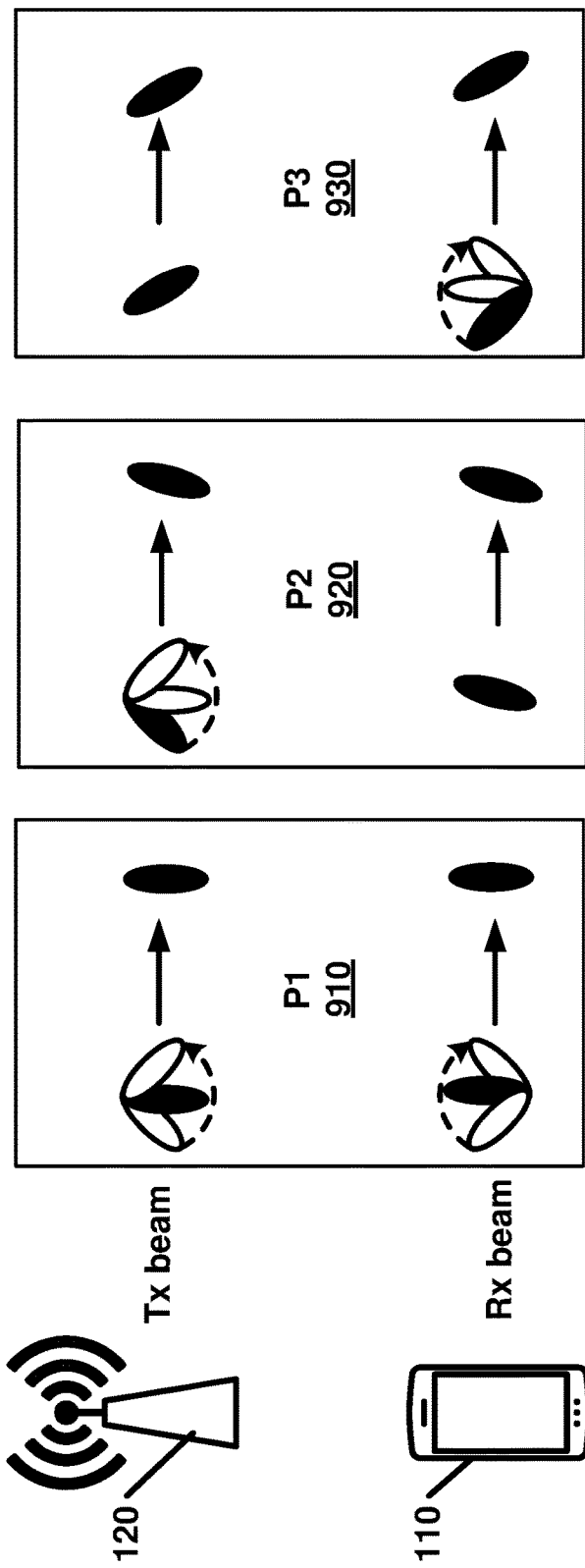
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
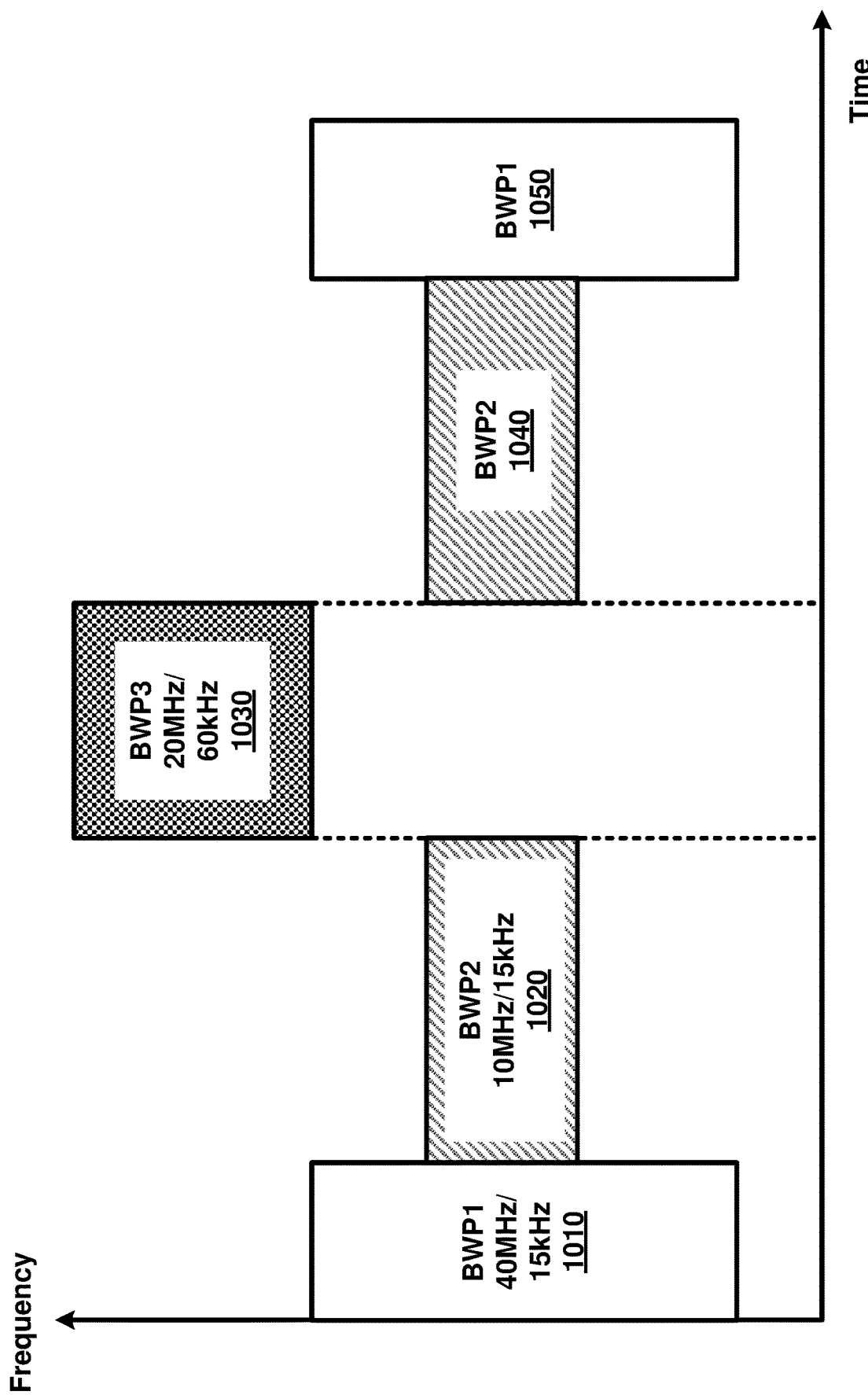
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
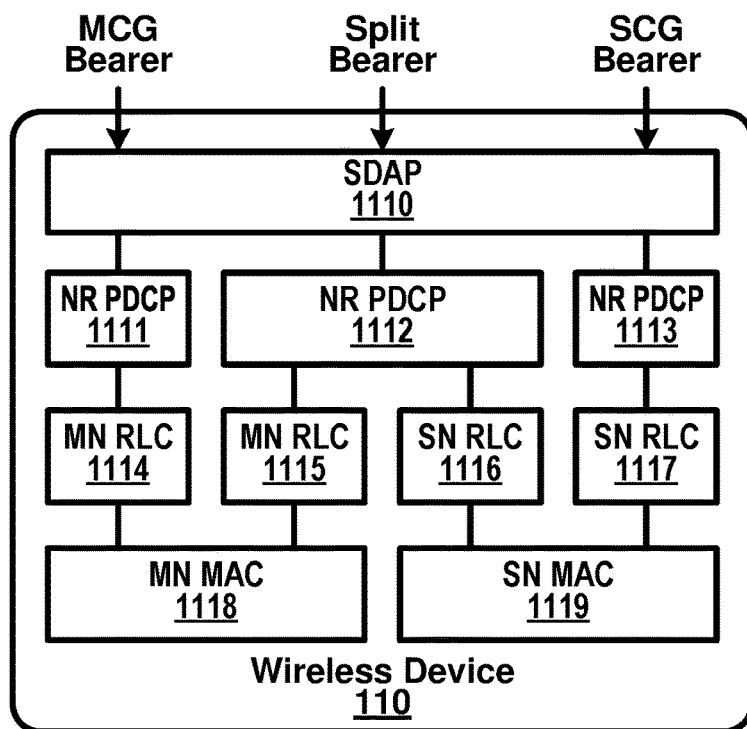
FIG. 11A, and FIG. 11B are diagrams of an example multi connectivity as per an aspect of an embodiment of the present disclosure.
Figure 11B:
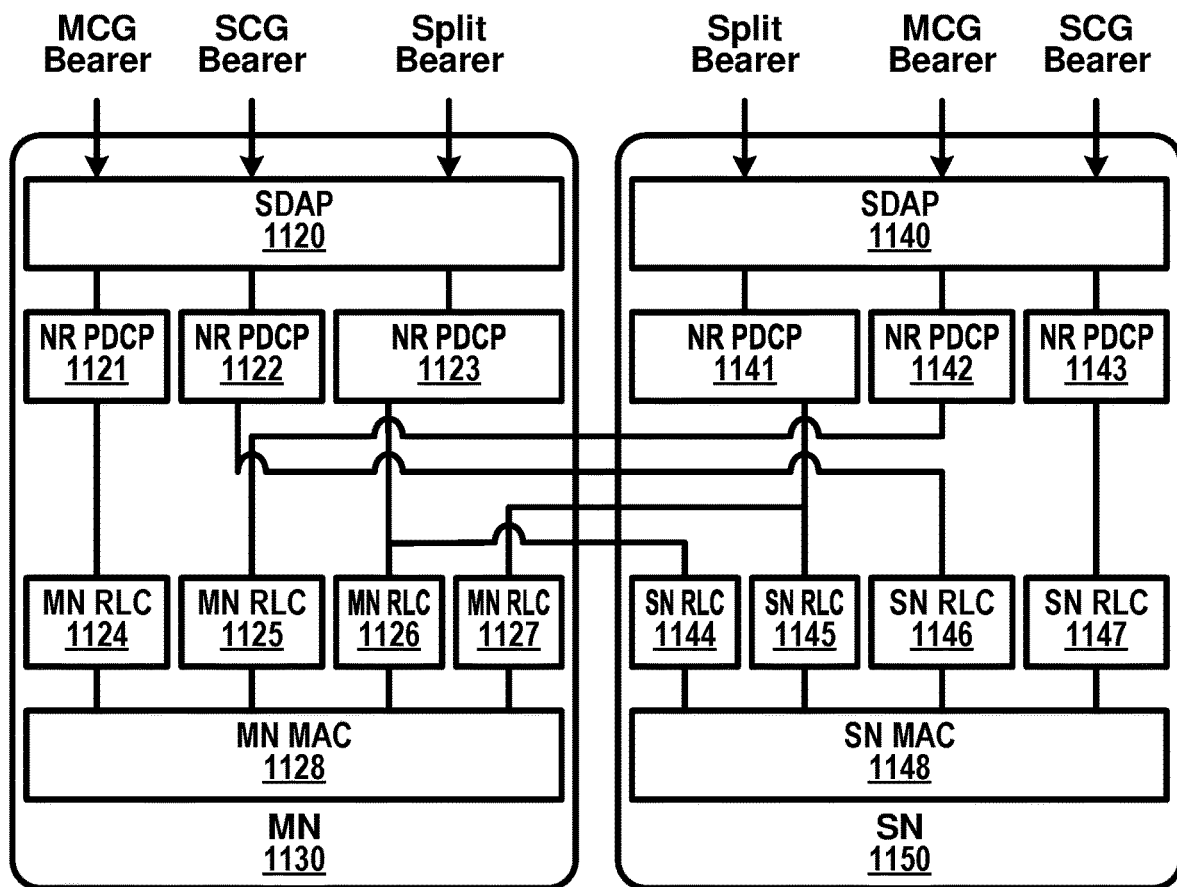

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not be supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
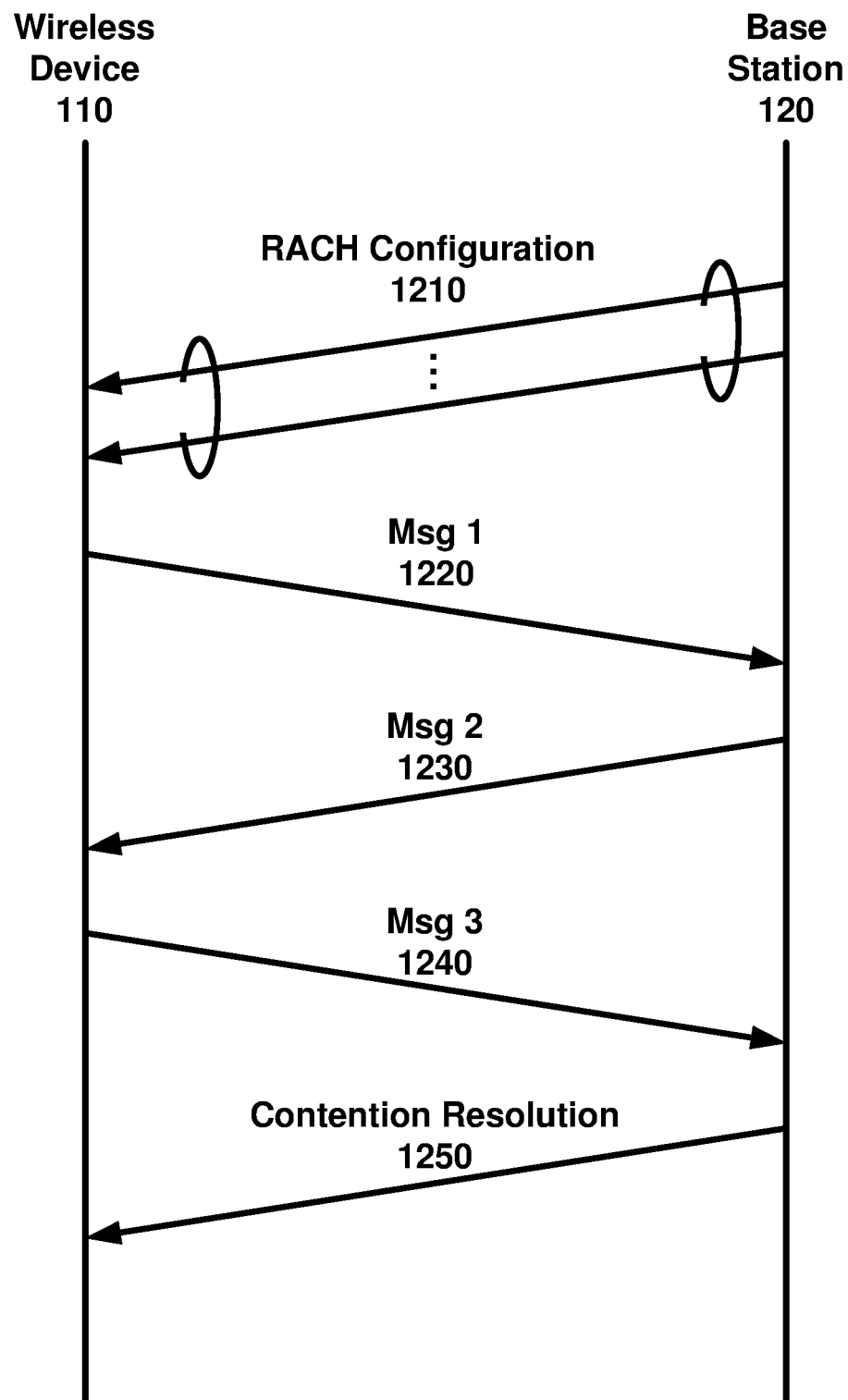
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
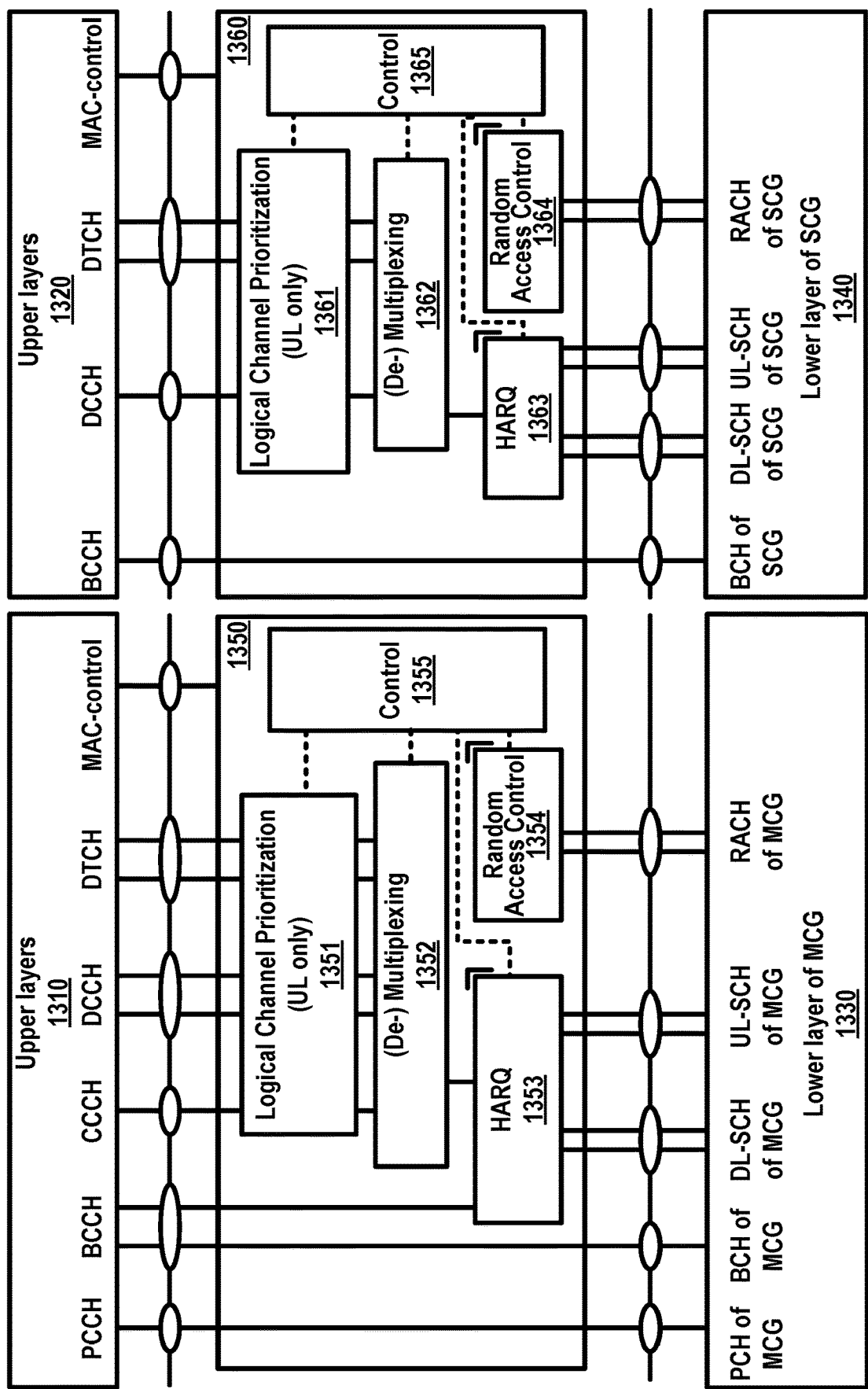
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
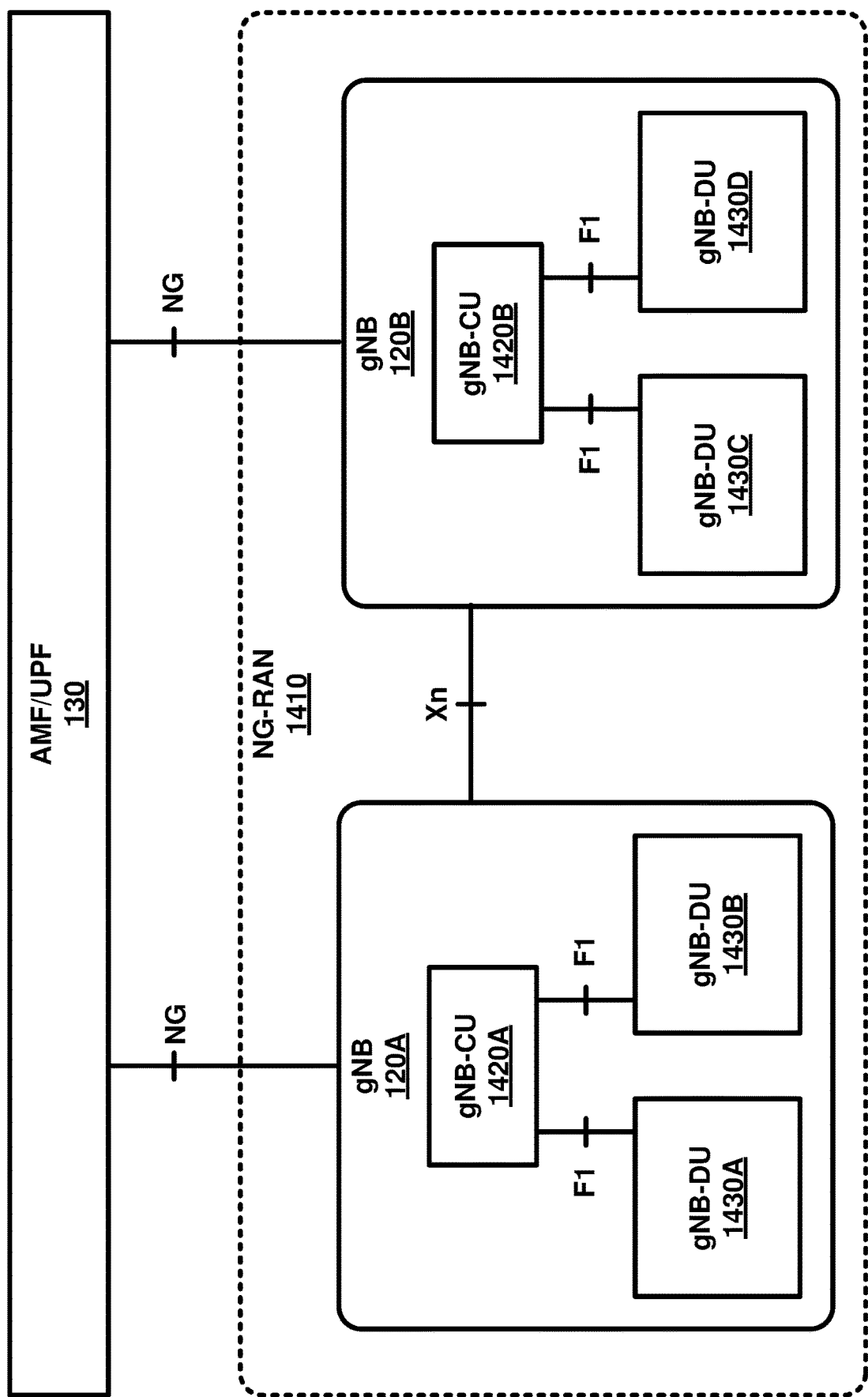
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
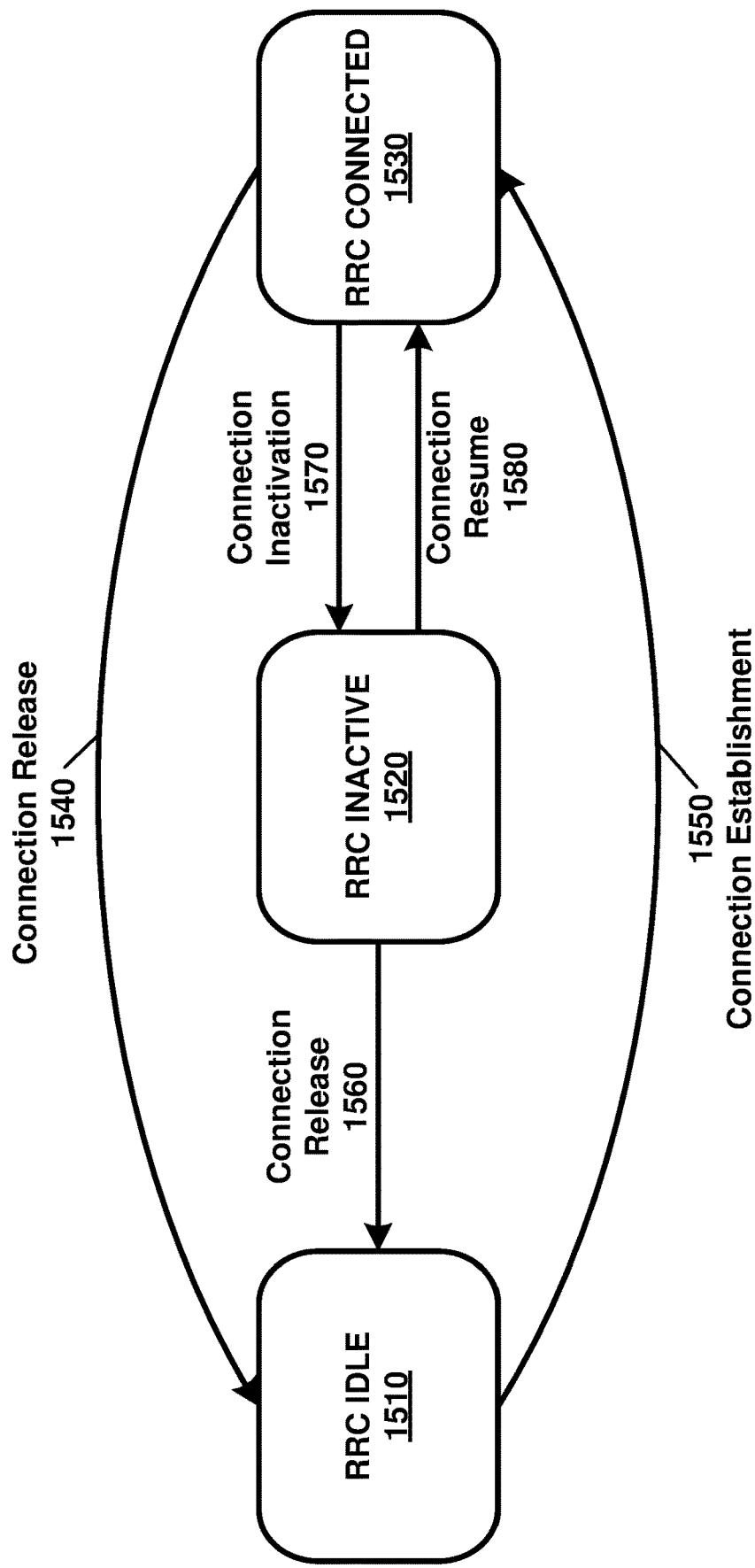
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

In existing technologies, for example, monitoring the DCI from a second base station during a measurement gap to a first base station, a wireless device may not be able to efficiently support more than one systems at a time (e.g., maintain an active connection to a first system while monitoring a call request (e.g., paging) from a second system). For example, a wireless device may receive one or more configurations (e.g., paging opportunities, paging occasions) from the second system which may not be fulfilled by the wireless device while keeping consistent performance for the first system. For example, the paging occasions of the second base station may not be aligned with a UE measurement gap configuration to the first base station. The wireless device may experience one or more paging occasions of the second base station may fall in a same time/frequency resource that the first base station may use or schedule one or more control/data. For example, the wireless device may need to select monitoring the one or more paging occasions, which may lead to performance degradation of the first base station. For example, the wireless device may need to select monitoring the one or more control/data via the first base station, which may lead to skipping/missing receiving/monitoring the one or more paging occasions of the second base station.

For example, a wireless device may be connected to a first system based on UE transceiver. The wireless device may not have extra transceiver(s) for a second system to attempt a connection establishment with the second system, while keeping the connection to the first system. For example, the wireless device may not be configured with any gap, where the wireless device is allowed to skip monitoring control/data from the first base station, from the first system. In response to the lack of gap configuration, the wireless device may need to continuously monitor the first base station and thus the wireless device may not be able to perform DCI monitoring on the second system with a given limited UE capability. The wireless device may not be able to dynamically reallocate its resources/capabilities across different systems as each system/base station may allocate the resources based on (pre)-fixed/determined/indicated UE capabilities at a connection setup (e.g., radio resource control (RRC) setup process, RRC (re)establishment process). There is a need to enhance resource/capabilities sharing of a wireless device among one or more base stations of one or more systems such that the wireless device may effectively/dynamically allocate the resources/capabilities to different systems based on the needs.

In existing systems, a wireless device may establish a connection with a first base station of a first system. The wireless device may also monitor a call request (e.g., a message to initiate an RRC setup or an RRC connection) such as a paging request form a second base station of a second system based on its resource availability. In response to the call request such as the paging message from the second base station of the second system, the wireless device may respond to the second base station and may establish a connection to the second base station. The wireless device may disconnect/release the connection to the first base station in response to a successful connection setup between the wireless device and the second base station. The wireless device may stop one or more services associated with the first base station of the first system to establish an active connection with the second base station of the second system. This will degrade the Quality of Services at the wireless device. For example, a wireless device may experience a service interruption time between switching a service from the first base station of the first system to the second base station of the second system. For example, a wireless device may not get serviced on one or more services from the second system which were actively supported by the first system. For example, a wireless device may have lower throughput from the second system with limited bandwidth and/or data rate supported by the second system compared to the first system. For example, a wireless device may experience down-time for one or more services due to hand-over/switching latency across multiple systems. There is a need to enhance mechanisms to support advanced UEs (user equipment) with one or more transceivers and/or one or more SIMs.

In existing technologies, a wireless device may determine one or more first UE capabilities supported for a first system. The wireless device may determine one or more second UE capabilities for a second system based on the one or more first UE capabilities. The wireless device may indicate the one or more second UE capabilities to a second base station of the second system during/after an RRC setup/connection with the second base station. The wireless device may maintain the one or more second UE capabilities for the second system regardless of whether the wireless device is connected to the first system or not. For example, when the wireless device is disconnected from the first system, the wireless device may have more capabilities supported for the second system. Existing technologies, however, may require reestablishing an RRC connection to the second system to update new UE capabilities. This may lead to increase service interruption time and message overhead of RRC reestablishment/setup procedure.

For example, a wireless device may occasionally change from a first system to a third system while the wireless device is connected to a second system. Depending on radio access technologies, frequencies, and/or services of each system, the wireless device may determine a different set of UE capabilities assigned/allocated/partitioned/determined for each system. For example, the wireless device may determine one or more first UE capabilities for the first system and the wireless device may determine one or more second UE capabilities for the second system. The wireless device may determine one or more third UE capabilities for the third system, which may lead changes of UE capabilities for the second system, for example, one or more fourth UE capabilities. Changes of UE capabilities for a system may require an RRC reestablishment/setup procedure based on existing technologies. Enhancements to allow dynamic adaptation of UE capabilities for a first system based on one or more second systems without going through an RRC setup/reestablishment procedure may be necessary.

In an example, a wireless device may have one or more radio transceiver capabilities. The wireless device may determine a resource partitioning and may dynamically reallocate resources across one or more radio systems. To reflect the resource reallocation appropriately, the wireless device may update the resources/capabilities to one or more base stations of the one or more radio systems such that the one or more base stations accordingly utilize the indicated resources/capabilities. For example, a wireless device may use the one or more transceivers for one or more carriers activated from a first base station of a first system when the wireless device may not receive any signal or may not transmit any signal to a second base station of a second system. For example, the wireless device may have two transceivers where the wireless device may utilize at least one transceiver to receive a service from Intelligent Transportation Systems (ITS) for Vehicle-to-everything (V2X) services when the wireless device is on the car. The wireless device may not be connected to an ITS system when the wireless device is not on the car. When the wireless device may not be associated with a second system (e.g., ITS), the wireless device may be able to utilize all transceiver capabilities on the connection to the first base station of the first system. For example, the wireless device may be configured with more than one active carriers with the two transceivers.

For example, a wireless device may have a transceiver working in around 6 GHz range. The wireless device may support V2X in ITS spectrum (~5.9 GHz) and unlicensed spectrum (~5.2 GHz) with the transceiver. With different services of V2X (e.g., driving in a highway) and unlicensed spectrum (e.g., walking in a hot-spot), the wireless may operate one system at a time with the transceiver. In an example, a wireless device may determine a use of one or more radio transceivers to support one or more systems.

A base station of one system may not be able to communicate with another base station of another system. Depending on active connections to one or more systems, a wireless device may have different set of capability for a system. For example, if a wireless device is connected to a first and second system with two transceivers where one transceiver is used for one system respectively, the wireless device may not support a certain set of frequencies/bands/band combinations for the first system. In that case, the wireless device may inform to the first system, with keeping an RRC connection to the first system, that the wireless device may be able to support one or more first set of band combinations whereas the wireless device may not be able to support one or more second set of band combinations. The wireless device may support the union of the first and second set of band combinations if all resources are allocated to the first system.

In an example, a wireless device may effectively adapt the resources dynamically for supporting one or more systems across one or more base stations, while keeping one or more RRC connection to the one or more systems, without explicit coordination among the one or more base stations. The wireless device may transmit/provide assistance information to one or more base stations so that each base station of a system may adjust the resource configuration to the wireless device accordingly. The wireless device may achieve the Quality of Services from one or more services by the one or more systems with wireless device's capabilities to a base station, wherein the wireless device is connected to the base station. The base station may adapt resource configurations to the wireless device based on the updated capabilities of the wireless device to reduce performance degradation at the wireless device. the base station of a system may not have necessary knowledge to determine an appropriate resource partitioning across multiple systems. The appropriate resource partitioning may depend on one or more systems that a wireless device may like to support, one or more radio transceiver architecture and capabilities to determine how to share radio transceivers, or timing advance values and/or synchronization aspects from the one or more systems to determine whether one or more transceivers/base band capabilities may be shared. Indication of needed knowledge of such information by a wireless device to a base station may lead considerable overhead.

The knowledge may be private to a wireless device and may not be desirable to share with one or more base stations. The wireless device may determine the resource partitioning across one or more systems and inform the decision by indicating the allocated resources to each base station of one or more systems, wherein the wireless device is connected to and/or is monitoring control/data from the each base station of the one or more systems. The wireless device may effectively determine a candidate/good/recommended resource partitioning based on one or more services, one or more systems, and its capabilities. This may allow a wireless device to get different services from different systems without degrading the performance and without requiring a communication across different systems. This may allow to reduce a service interruption time of a system regardless whether the wireless device may support a single system or a plurality of systems and/or regardless whether the wireless device may change from a second system to a third system while the wireless device maintains an RRC connection to a first system.

In an example, a wireless device may support more than one SIM (subscriber identification module) card (e.g., two). A dual SIM UE/device (e.g., a wireless device with two SIM cards) may be interpreted as a multi SIM UE/device (e.g., a wireless device with a plurality of SIM cards). A dual SIM UE and a multi SIM UE may be used interchangeably. Embodiments/examples shown in the specification may be applied for a wireless device with dual SIM cards and/or more than two SIM cards. Multi SIM devices may address example use cases: the user has both a personal and a business subscription and wishes to use them both from the same device (e.g., this use case may become popular with bring-your-own-device (BYOD) initiatives); and/or a user has multiple personal subscriptions and chooses which one to use based on the selected service (e.g., use one individual subscription and one "family circle" plan); and/or a user has one or more different services supported by one or more systems (e.g., a V2X service in ITS system and a voice service via a cellular system). In at least one of the example use cases, SIMs may be from the same or from different mobile network operators (MNOs). Multi SIM devices may support a variety of implementations and/or behaviors (e.g., Dual SIM Single Standby, Dual SIM Dual Standby, Dual SIM Dual Active, etc.).

In an example, a wireless device may support more than one systems (e.g., two) with a single SIM card. A single SIM device may address the example use cases with a single SIM card for a UE. Regardless of the number of SIM cards that a wireless device may support, a multi-system device may support more than one systems. Example systems may include a 3GPP network (e.g., RAN and Core) based on a PLMN, a ITS system (e.g., based on 3GPP V2X technology, based on DSRC technology), a Wi-Fi system (e.g., local area network based on IEEE 802.11), a Bluetooth system, and/or the like. A multi-system device may support a variety of implementation and/or behaviors such as a single system active only, a single system active with a second system standby, more than one system active, and/or the like.

An implementation of a multi-system device may use one or more common radio transceivers and/or baseband capabilities. The multi-system wireless device may share the capabilities among the multiple SIMs of the device (if multiple SIMs are supported). The multi-system wireless device may share the capabilities across one or more base stations and/or one or more systems. In an example, a wireless device having two transceivers may use a first transceiver to get a voice call from a first PLMN of 3GPP system and may use a second transceiver to check for communications or signals from a second PLMN of 3GPP system (e.g., to read a paging channel, perform measurements, and/or read system information) and/or communicate with the second PLMN of 3GPP system.

In an example, a wireless device may have an active connection to a first system and the wireless device may monitor a potential call from a second system based on a paging message. The second system may operate a paging mechanism based on Paging Occasions (POs). POs may be calculated based on a UE identifier (IMSI and/or 5G-S-TMSI for EPS and/or 5GS, respectively) and/or one or more configuration parameters indicated in one or more system information broadcast messages (e.g., SIBs). Though POs may not occur very frequently, making one or more radio transceivers of a wireless device available for each PO of the second system may not be easily possible if the one or more radio transceivers are used by the first system actively. This may lead missing of some POs which may impact the reliability of the paging message. A wireless device may need to perform necessary measurements on the first system and the second system as the wireless device may keep moving. The wireless device may not be able to perform measurement on the second system with limited unused resources as a result that most resources are being used to support the first system. Effective sharing of the resources across different systems based on solely UE implementation may have limitations.

Figure 16:
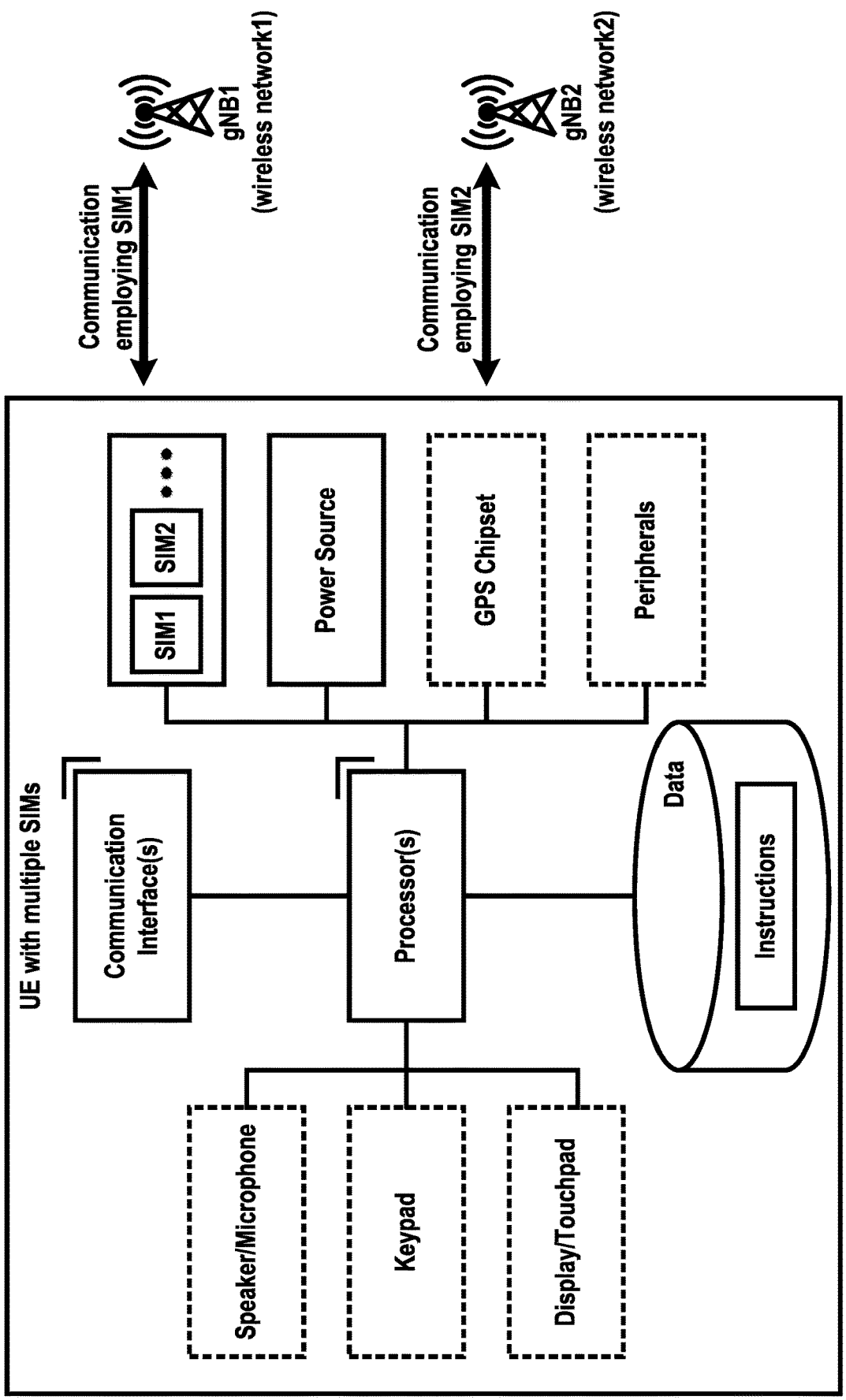
FIG. 16 illustrates an example diagram of a wireless device with more than one Subscriber Identification Module (SIM).
Figure 17:
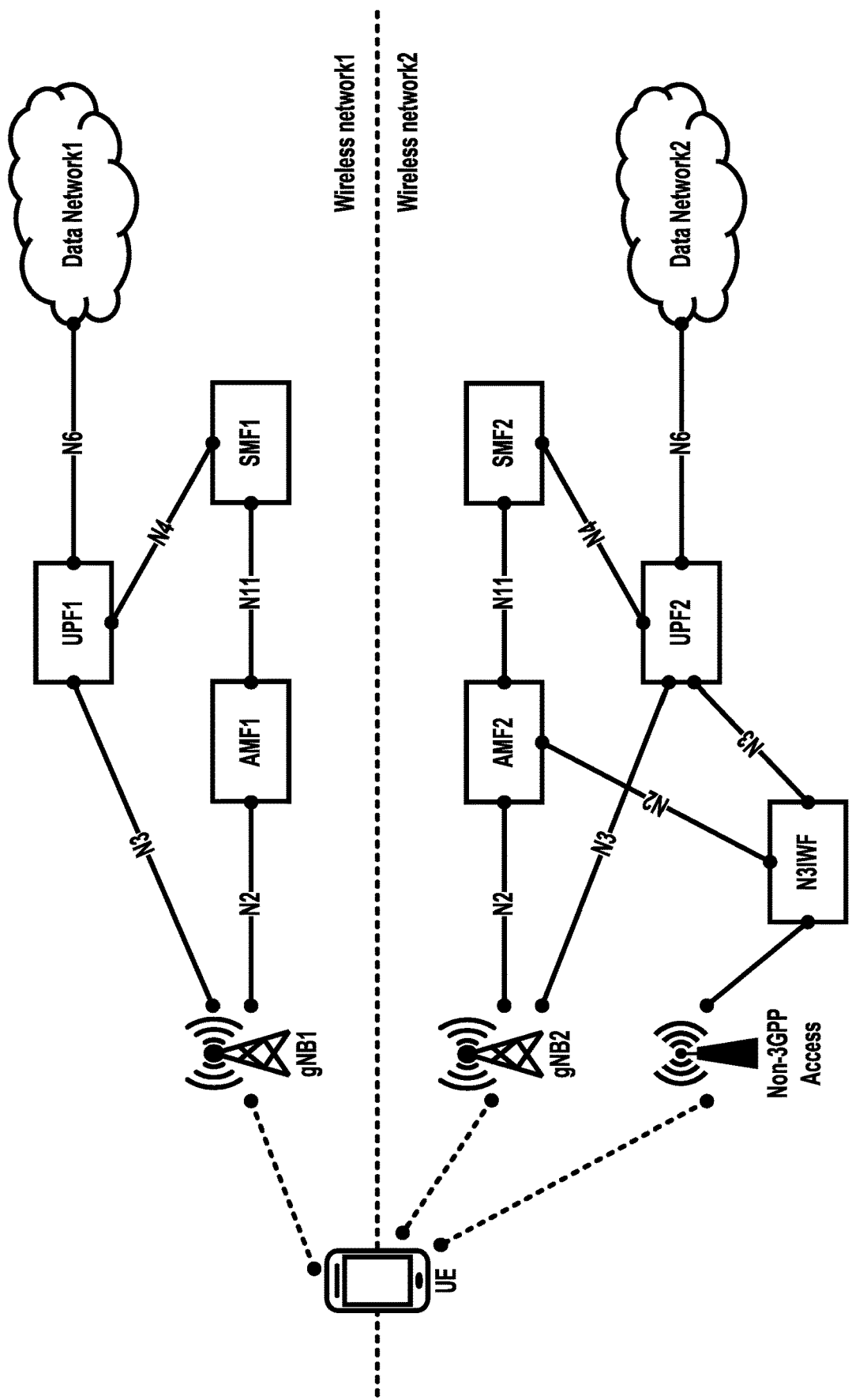
FIG. 17 illustrates an example diagram that a wireless device may support two data networks (e.g., multiple systems).

In an example, as shown in FIG. 16 and/or FIG. 17, a UE (e.g., wireless device, vehicle, communication device, handset, etc.) may use/employ a first radio access technology (e.g., access technology1, 3GPP access network, eNB, gNB, base station, ITS system etc.) and/or a second radio access technology (e.g., access technology2, non-3GPP access network, WLAN, Wi-Fi, Bluetooth, CDMA network, V2X system, etc.). A first wireless system may comprise a first wireless network, a first public land mobile network (PLMN), and/or a first radio access technology. A second wireless system may comprise a second wireless network, a second public land mobile network (PLMN), and/or a second radio access technology. A wireless device may be connected/registered to an access node (e.g., access point (AP), wireless access point (WAP), router, 3GPP access, non-3GPP access, ITS system, DSRC server, wireless access network (WAN), and/or the like). In an example, a first SIM (e.g., SIM1) may be a same as a second SIM (e.g., SIM2). For example, SIM1 and SIM2 of a wireless device shown in FIG. 16 may be a single entity.

In an example, a first wireless network may comprise at least one of a first PLMN, a first access technology (e.g., system, network), a first communication system (e.g., V2X system, cellular-V2X system, intelligent transportation system (ITS), IoT system, cellular communication system, etc.), a first 5th generation (5G) wireless network, a first long-term evolution (LTE) wireless network, a first universal mobile telecommunications service (UMTS) wireless network, and/or the like. In an example, a second wireless network may comprise at least one of: a second PLMN, a second access technology (e.g., system, network), a second communication system (e.g., V2X system, cellular-V2X system, intelligent transportation system (ITS), IoT system, cellular communication system, etc.), a second 5G wireless network, a second LTE wireless network, a second UMTS wireless network, and/or the like. In an example, the first wireless network may comprise at least one of: the first radio access technology (e.g., 3GPP access network); and/or the second radio access technology (e.g., non-3GPP access network).

A wireless device may have one or more radio transceivers as shown in FIG. 18A-FIG. 18C. Example scenarios of sharing UE capabilities are illustrated in FIG. 18A-FIG. 18C. A wireless device may share one or more transceivers (e.g., 1RX and 1TX) across a first system (e.g., wireless network 1) and a second system (e.g., wireless network 2) as shown in FIG. 18A. If two systems are synchronized, a wireless device may perform resource partitioning based on frequency domain partitioning and/or time domain partitioning. The wireless device may perform resource partitioning based on frequency domain partitioning and/or time domain partitioning across more than one systems based on its capabilities (e.g., double FFT processing capability associated with a single RX to address asynchronous systems operating on the same frequency ranges, multiple RX capabilities). To effectively enable resource sharing across more than one systems with one or more shared RX chains and/or TX chains without degrading performance of a system, loosely or tightly coupled coordination may be needed. The wireless device or a first base station may determine a first gap pattern based on a time duration needed for a second system at each period (e.g., duration of each PO for the wireless device for the second system, measurement duration needed for one shot measurement for the second system, data reception or transmission time in each period, and/or the like) and necessary frequency retuning and/or RF switching latency to change from a first frequency for the first system to a second frequency for the second system (and a similar latency to return to the first frequency after the operation). For example, ITS system and Wi-Fi system may use different center frequency where a wireless device needs X symbols/slots of switching latency to change a center frequency depending on the system.

FIG. 18B illustrates an example of resource sharing of a radio transmitter (e.g., TX) chain with a dedicated radio receiver (e.g., RX) chain per each system is shown, where a single transmitter (e.g., TX) chain may be shared across systems or dedicated to a system among the systems. For example, the wireless device may transmit using a single TX to more than one system based on a time-domain division manner. For example, the wireless device may transmit using a single TX to more than one system based on a frequency-domain division manner. For example, the wireless device may assign a dedicated RX chain for each system (e.g., a first RX chain to a first wireless network and a second RX chain to a second wireless network in FIG. 18B). With the dedicated RX chain for the each system, a coordination across the systems may be limited to a resource sharing for the TX chain.

For example, when the wireless device may not support concurrent transmission to the first and the second system, the wireless device may drop one uplink signal of a system if two uplink signals (e.g., a first uplink signal to the first network and a second uplink signal to the second network) are colliding at the same time resource. The wireless device may select the first uplink signal or the second uplink signal based on contents of the signal (e.g., if a uplink signal carries more important payload such as HARQ-ACK feedbacks, the uplink signal is selected over the other) and/or based on a certain set of rules (e.g., longer transmission is selected, a first system's uplink signal is selected, a higher priority of a content carried in each uplink signal is selected). When the wireless device is able to transmit both uplink signals at a given time with a limited power, the power for an uplink signal may be determined based on a set of predefined rules, based on the priority of the contents, based on the services, based on the systems and/or the like. For example, a wireless device may inform to the first network and/or the second network that one or more uplink signals may be skipped in case of collisions.

The wireless device may determine a periodicity, a duration (and/or an offset) for the first network where the wireless device may prioritize on an uplink signal to the second network over an uplink signal to the first network. The wireless device may inform a similar information to the second network. The wireless device may support more than one uplink carriers for a network using a single TX. The wireless may support lower number of carriers for the system using the single TX when the wireless device shares the single TX across multiple systems. For example, the wireless device may support intra-band contiguous or non-contiguous carrier aggregations in a first frequency for the first network band using a single TX. The wireless may support a single carrier on the first frequency band for the first system when the wireless device shares the TX between the first network and the second network. Similar example may also apply to a single RX case. Examples are also applicable where a UE share one or more TX chains and/or RX chains across multiple systems. A wireless device may support lower number of carriers in a band (for UL, DL or DL and UL) when the wireless device shares the resource across multiple systems compared to the case when the wireless device dedicates the resource to a single system.

FIG. 18C shows that TX and RX chain capabilities may be dedicated to a system/network. A wireless device may determine a first set of TX and RX chains dedicated to a first system (wireless network 1), and a second set of TX and RX chains dedicated to a second system(wireless network 2). For example, the wireless device may have a first transceiver supporting 2 GHz and a second transceiver supporting 5.9 GHz. The wireless device may dedicate the first transceiver to support an LTE or NR system and may dedicate the second transceiver to support an ITS system (e.g., V2X system). For example, the wireless device may not utilize the second transceiver to activate an unlicensed spectrum around 5.9 GHz in an LTE or NR system (e.g., a first system) regardless whether the wireless device is currently under being serviced by the second system (e.g., ITS system, V2X system). For example, the wireless device may hard-split one or more resources across multiple systems. For example, the wireless device may change the hard-split resources for a system via registration process (e.g., when a wireless device register to a system core network) and re-registration process. A wireless device may request a registration message to AMF where AMF may initiate capability re-negotiation between a base station and the wireless device. When the wireless device reallocates the resources across multiple systems, the wireless device may reinitiate registration process for each system for the multiple systems respectively.

Figure 19:
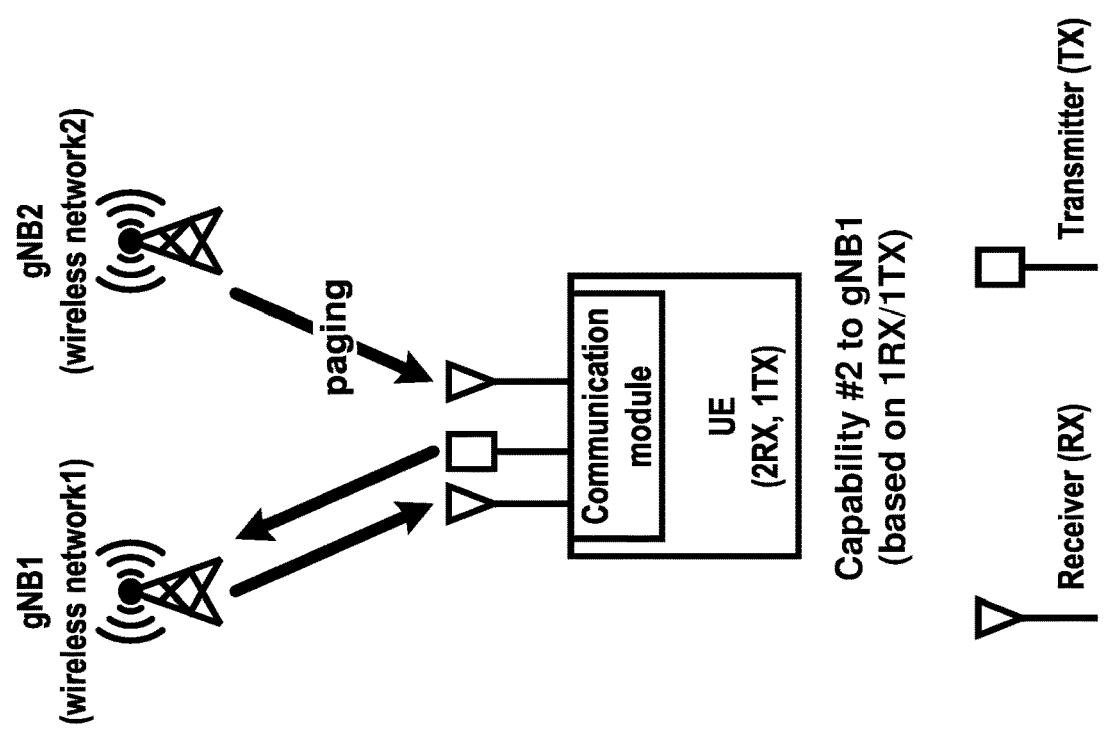
FIG. 19 illustrates an example of an embodiment that a wireless device may reallocate the resources (e.g., one or more radio transceiver capabilities) across multiple systems.
Figure 19:
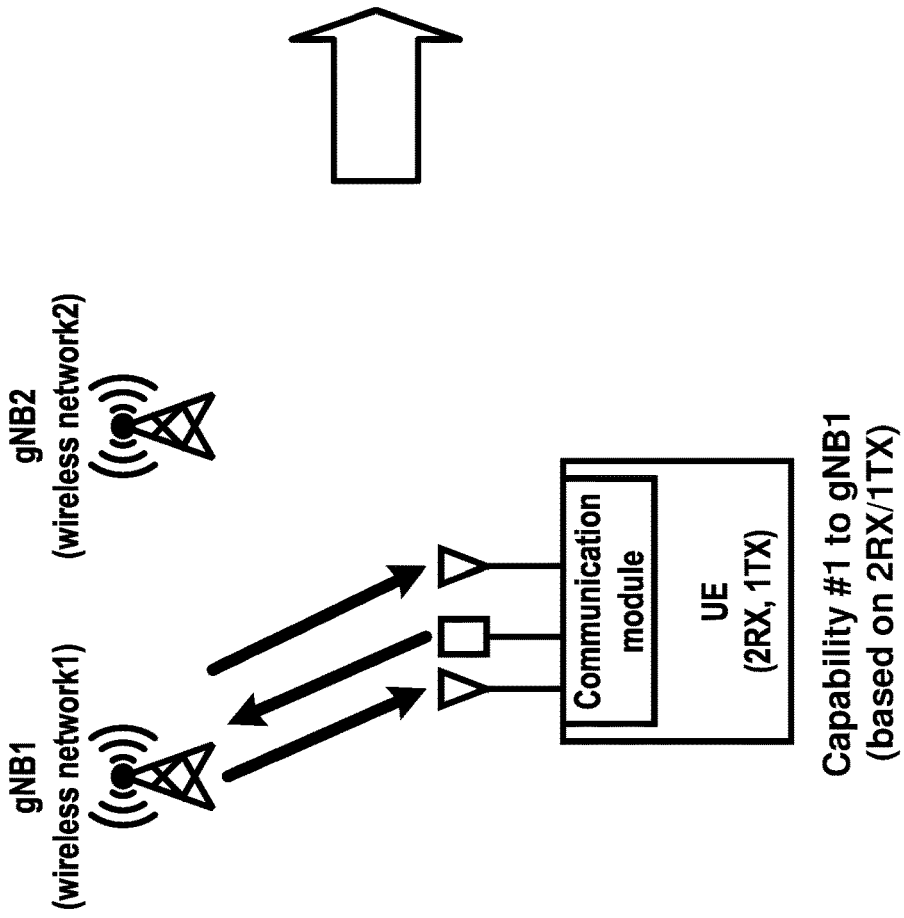

In an example, a wireless device may change a resource allocation to one or more systems on-demand (e.g., dynamically without going through re-registration/RRC reestablishment process). For example, as shown in FIG. 19, a wireless device may allocate 2 RX chains and 1 TX chains to a first system (e.g., wireless network 1) at a time. The wireless device may change the allocation to 1 RX chain and 1TX chain to the first system (e.g., wireless network 1) and 1 RX chain to a second system (e.g., wireless network 2) at another time. The wireless device may inform to the first system (e.g., wireless network 1, a first base station, a first network) about a new resource allocation via a UE-assistance signaling such as via RRC signaling. For example, the wireless device may inform a first capability set to a first base station for a first set of resource allocation (e.g., 2 RX chains and 1 TX chain for the first system) at the time. The wireless device may identify the second system, for potentially monitoring a paging messages after the time.

The wireless device may determine to assign the second RX chain for the monitoring the paging message from the second system/network/base station. The wireless device may determine a second capability set for the first system/first base station based on the determining. The wireless device may inform/update the second capability set (e.g., via an RRC sending a list of supporting carriers/cells) for a second set of resource allocation to the first base station. The second capability set may be updated from the first capability set based on the wireless device changes the resource allocation configuration across multiple systems (e.g., 1 RX chain and 1 RX chain for the first system and allocate 1 RX chain for the second system). For example, the wireless device may release one or more cells of the first system, wherein the wireless device may support the one or more cells based on the second RX chain, in response to assigning the second RX chain to the second system. The wireless device may move away or switch a frequency for monitoring the paging message from the second system/network/base station. The wireless device may update resource allocation such that both RX chains are allocated to the first system.

When the wireless device releases the resource/RX chain for the second system, the wireless device may update to the first system about the change. For example, the wireless device may transmit an indication of invalid of the second capability set. In response to the indication, the first base station may fallback to the first capability set. For example, the wireless device may transmit a third capability set (e.g., band combinations supported based on two RX chains). In response to the third capability set, the base station may update one or more carriers/cells configured/activated to the wireless device. For example, the wireless device may transmit one or more messages indicating a fallback to a single system to the first base station. In response to the one or more messages, the base station may assume the first capability set of the wireless device becomes valid again as the wireless device may support only the single system at a given time.

In an example, the wireless device may transmit a first capability set (based on supporting a single system) and a second capability set (based on supporting a plurality of systems) at an RRC setup/(re)establishment to a first base station. The wireless device may inform to the first base station between the first capability set to be applied or the second capability set to be applied based on one or more RRC signaling/messages. For example, the wireless device may inform a single system is supported or a plurality of systems is supported at a time. Based on the indication, the first base station may update a capability set of the wireless device. For example, in FIG. 19, the wireless device may indicate/update the Capability #1 to the first base station (e.g., gNB1) when the wireless device releases the second 1 RX chain from the first system and uses it for the second system.

In an example, a wireless device may inform a first capability set to a first base station in a connection setup procedure with the first base station of a first system. The wireless device may respond the first capability set (e.g., via an RRC signaling, sending a list of band and/or band combinations) to the first base station when the first base station sends a capability inquiry request during/immediately after an RRC setup process/an RRC (re)establishment process/a registration process. The wireless device may inform a second capability set to the first base station after the connection setup procedure while maintaining the RRC connection to the first base station via one or more RRC messages. For example, the second capability set may be a subset of the first capability set or the same as the first capability set. For example, a second capability set may comprise a list of band combinations that the wireless device may support for the first system based on reallocation of the resources.

In an example, a wireless device may support 2 RX chains and 1 TX chain where the wireless device may support band 1, band 2, and band 1+band 2 (2 DL-1 UL), band1+band1. The wireless device may support band 1 using a first RX chain and 1 TX chain. The wireless device may support band 2 using a second RX chain and 1 TX chain. The wireless device may support band1+band 2 using the first RX and the second RX chain with 1 TX chain. The wireless device may support band 1+band 1 using the first RX and the 1 TX chain, and/or the like. In an example, a wireless device may transmit a first set of band combinations to a first base station of a first system for example via an RRC setup procedure or after the RRC setup procedure. The first set of band combinations may comprise band1+band 2 and band1+band1, without an active communication/monitoring of a second system. The wireless device may be in a range of the second system. For example, the wireless device may enter a hot-spot region and/or a metro area where Wi-Fi systems may be available or the second system becomes available. For example, the wireless device determines to assign the second RX chain for the second system. Based on the determining to assign the second RX chain for the second system, the wireless device may determine that the second RX chain may not be available for the first system. Based on the determination, the wireless device may update a second set of band combinations for the first base station/the first system.

Based on the update, the wireless device may inform/update/transmit/indicate a new set of band combination for example band 1 and band 1+band 1 to the first system. The wireless device may transmit one or more RRC messages, with keeping RRC CONNECTED state, comprising the new set of band combinations to a first base station of the first system, wherein the wireless device may be connected to the first base station. The wireless device may temporarily disable use of the second RX chain for the first system. The wireless device may inform/indicate/transmit a starting time, a duration (or a periodicity and a duration) when the new updated capabilities become effective. The wireless device may transmit the information (e.g., the starting time, the periodicity and the duration) via one or more second RRC messages. After the duration, the wireless device may release the use of second RX chain from the second system and may start using the second RX chain for the first system.

For example, the first base station may assume that the second set of band combinations may be valid during the indicated duration. After the duration, the first base station may assume that the first set of band combinations may be effective/valid. After the duration, the first base station may assume that the first capabilities are valid, and it may ignore the second capabilities. In an example, a second of capabilities may include a list of band combinations that the wireless device may not support. In the example, the wireless device may indicate band 2 and band 1+band 2 in the second set of capabilities. The first system may interpret the second capabilities as the temporarily disabled band combinations. The first system or the first base station may de-configure and/or deactivate one or more cells corresponding to the second capability set. For example, if the wireless device has been configured/activated with CC1 from band 1 and CC2 from band 2, the first system may deactivate CC2 and deconfigure CC2 (e.g., release configuration parameters of CC2) from the wireless device. In an example, a wireless device may deactivate and/or release one or more carriers/cells corresponding to the second capability set in response to informing the first base station on the second capability set. In an example, the first base station may deactivate or de-configure one or more carriers/cells not corresponding to the second capability set if the second capability set indicates the supported set of band combinations. In an example, the wireless device may deactivate or de-configure (e.g., UE autonomously without receiving a command from the first base station) one or more carriers/cells not corresponding to the second capability set if the second capability set indicates the supported set of band combinations In an example, the wireless device may send/transmit/indicate, via one or more RRC messages, the second capability set which comprise either a list of carriers/cells supported by the wireless device. In an example, the wireless device may transmit/send/indicate, via one or more RRC messages, a list of carriers/cells temporarily not supported by the wireless device. In the example, the wireless device may inform/transmit/send, via one or more RRC messages, a list of carriers/cells that the wireless device may recommend not to activate or configure to the wireless device from a first base station of a first system at least temporarily or until when the wireless device indicates otherwise. The wireless device may inform a list of carriers or a list of frequency layers where the wireless device may not be configured with an active PCell, PSCell or SCell for a first system.

In an example, a wireless device may inform the second capability set comprising a list of carriers or a list of frequency layers, wherein a carrier/frequency layer of the list of carriers or the list of frequency layers may not comprise a PCell, SPCell and/or SCell configured for the first system including both active cell(s) and deactive cell(s). The wireless device may not degrade performance of the first system by indicating the second capability set comprising any serving cell frequency of the first base station/network/system. In an example, a wireless device may inform a list of measurement objects or a list of frequency layers that the wireless device may not be able to perform measurements for a system based on supporting the second system. For example, the wireless device may indicate to the first base station that the wireless device is required to be configured with a measurement gap as one or more remained/available RX chain(s) are reallocated to support the second system. For example, the wireless device may indicate to the first base station that one or more carrier frequencies may not be available for the radio resource monitoring (RRM) measurements. The wireless device may inform a first list of measurement objects or a first list of frequency layers that the wireless device is not able to perform measurements due to resource reallocation between the first system and the second system. The wireless device may inform a second list of measurement objects or a second list of frequency layers that the wireless device is not able to perform measurements without a measurement gap configuration due to resource reallocation between the first system and the second system.

Figure 20:
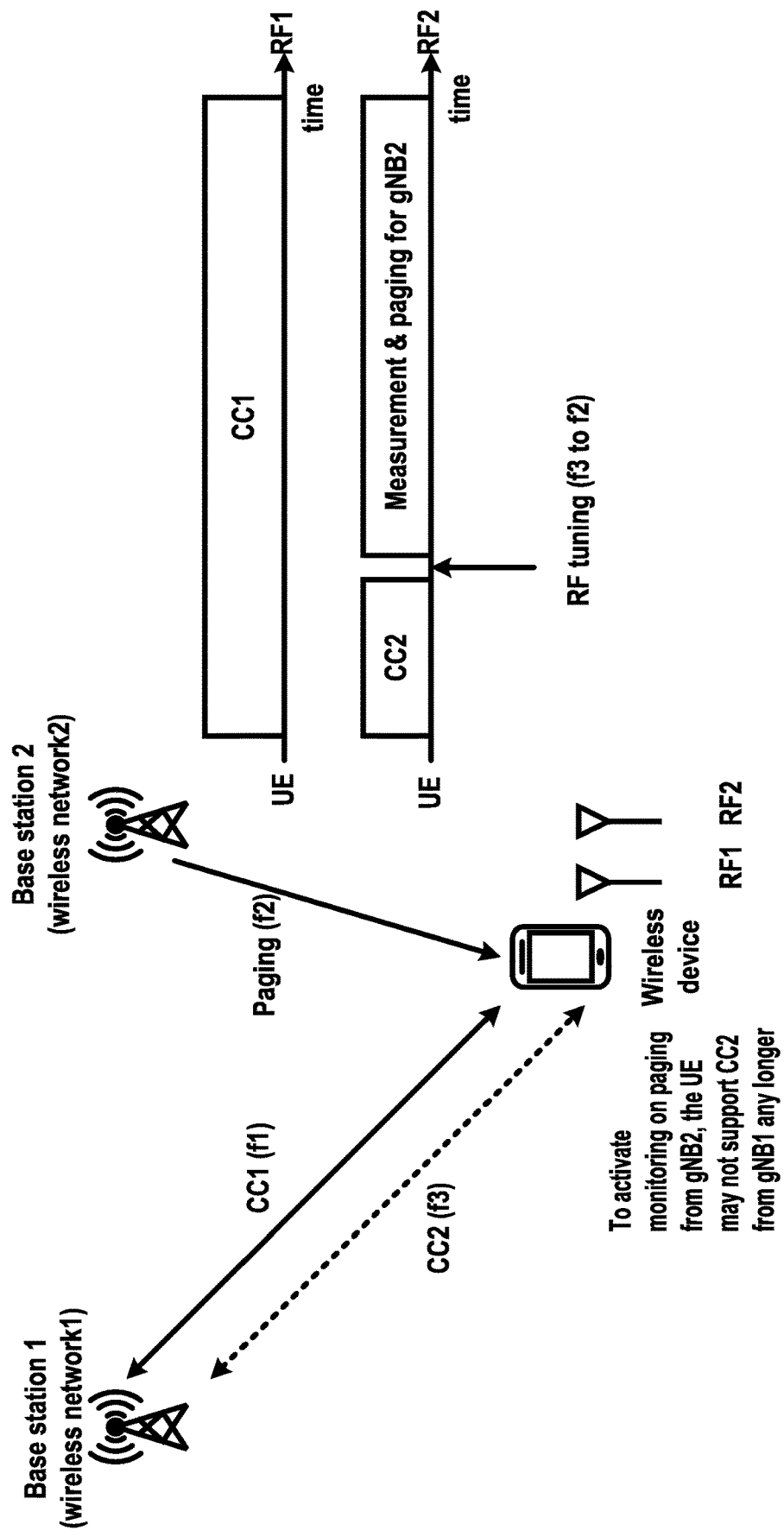
FIG. 20 illustrates an example embodiment of resource reallocation.

In an example, as shown in FIG. 20, a wireless device receives one or more RRC messages configuration of CC1 and CC2 from base station 1. The wireless device may be equipped with a first RF (RF1) and a second RF (RF2), wherein RF may indicate a transceiver or a receiver. The wireless device may allocate the available transceiver resources to base station 1 to support CC1 and CC2 at a time. At the time, the wireless device may support only a first system with base station 1 and allocate all available resources towards the first system. The wireless device may discover a presence of a second system (e.g., wireless network 2) at another time, and may decide to listen on one or more paging messages from the second system. The wireless device may determine to allocate a second transceiver (e.g., RF2) to the second system to monitor the one or more paging messages. The wireless device may determine based on the paging occasion configurations of the second system, the required measurements on the second system, the measurement gap configuration of the first system, the time to switch between one or more frequencies of the first system and one or more frequencies of the second system, the importance of one or more services that the second system may provide, one or more services that the first system is providing, and/or the like.

In response to adapted resource allocation, the wireless device informs base station 1 about the new allocation. In response to the updated information from the wireless device, base station 1 may deactivate CC2 and/or may also de-configure CC2 to avoid measurements on the CC2 as a serving cell. The wireless device may return the second transceiver (e.g., RF2) from f3 to f2 (e.g., from CC2 to a center frequency of a second system paging carrier/cell). In an example, a wireless device may inform a second list of band combinations to recommend 'deprioritizing' on the second list of band combination. For example, the wireless may indicate supporting of 'band 1', 'band 2', 'band 1+band 1', and 'band 1+band 2' for downlink carrier aggregation. The wireless device may inform 'band 2', and 'band 1+band 2' as the second list of band combination where the wireless device recommends not to configure/activate a carrier aggregation combination corresponding to 'band 2' or 'band 1+band 2'.

For example, a configuration of a primary cell of band 2 configuration or a configuration of a primary cell of band 1 and one or more secondary cells of band 2 may not be recommended by the wireless device. The network/base station may still configure or activate a carrier aggregation combination corresponding to one or more of the second list of band combination. The wireless device may skip receiving one or more downlink control information and/or downlink data if the configured and/or activated carrier combination(s) are corresponding to the second list of band combinations. For example, the wireless device may skip monitoring a DCI or receiving PDSCH on a SCell if the SCell is configured/activated from band 2. A wireless device may reject an 'activation' command from a first base station in response to a message from the wireless device to the first base station on the second list of band combination, and the activation command may request activation of one or more SCells corresponding to the second list of band combinations.

In an example, a wireless device may not be allowed to send a band where the wireless device is configured with PCell as one of the second list of band combinations to the first system/first base station/base station 1. The wireless device may not be allowed to comprise the band of PCell in the second list of band combinations, wherein the second list of band combinations may indicate one or more frequency bands/layers to be deactivated/deconfigured from the first system. For example, if the wireless device is configured with PCell from band 2, the wireless device may not inform to the first base station to deprioritize or remove band 2 from the supported band combination. In an example, a wireless device may not update its resource allocation across different systems if the resource update may impact the operation of PCell and/or PSCell and/or PUCCH-SCell. The wireless device may reject any service to the second system in such cases. FIG. 20 illustrates an example of monitoring a paging message from the second system. In FIG. 20, if the paging of the second system may require RF1, the wireless device may reject the second system or may request/camp on different frequency of the second system such that the wireless device is able to maintain the primary cell of the first system/first base station. A similar mechanism may be applied to different example such as a connection establishment to the second system while maintaining the connection to the first system, a vehicle-to-vehicle communication in the second system while maintaining a cellular service in the first system, a DSRC service in the second system with a V2X service in the first system, and/or the like.

In terms of sharing uplink resource(s) (e.g., TX chains), a similar mechanism may be applied. A wireless device may update a list of band combination depending on the uplink resource adaptation, may inform one or more uplink carriers to be deactivated/deconfigured, may recommend one or more band combinations to deprioritize, may inform a needed gap (and/or a gap pattern) in the uplink transmission in one or more frequencies (or a set of gap patterns where one pattern may be associated with one or more frequencies), may inform the sharing status, and/or the like. A base station may not deactivate uplink carrier/cell in response to receiving the resource allocation change. The base station may not schedule any uplink traffic on the indicated carriers/cells in response to receiving the resource allocation change. The wireless device may ignore any uplink grant and/or configured grant resources and/or PRACH resources and/or SR resources and/or SRS transmissions on one or more UL carriers corresponding to the indicated carriers/cells.

In sharing one or more TX chains/transceivers among multiple systems, a wireless device may have different capabilities depending on the available TX chains for a first system such as supporting of multiple TAGs (and the number of TAGs supported), simultaneous transmission/reception capabilities and/or the like. The wireless device may inform a second list of band combinations, and one or more changed capabilities applicable to the currently supported band combinations. For example, for a first band combination, a wireless device may support simultaneous transmission/reception at a time, and may not support simultaneous transmission/reception at another time. The wireless device may send 'disabled' simultaneous transmission/reception of the first band combination if the first band combination is still supported by the wireless device in response to a resource allocation adaptation.

In an example, a wireless device may not be allowed to update a resource allocation on one or more TX chain transceivers via a change of a list of supported band combinations. The wireless device may inform a set of carriers/frequencies/cells to a first system for an uplink transmission which are impacted by the resource allocation update. For example, if a wireless device may have two TX chains to support two active UL carriers in a first system, the wireless device may inform to the first system that an SCell UL may be interrupted to support other system(s). The wireless device may inform a gap pattern for a UL cell/carrier where the impact may occur. The wireless device may also consider any necessary switching latency in determining the gap pattern. The wireless device may drop any uplink signaling scheduled/configured to the requested gap. The wireless device may update capabilities in terms of a supported list of band combinations limited to a band combination of downlink (based on one or more RX chains).

Figure 21:
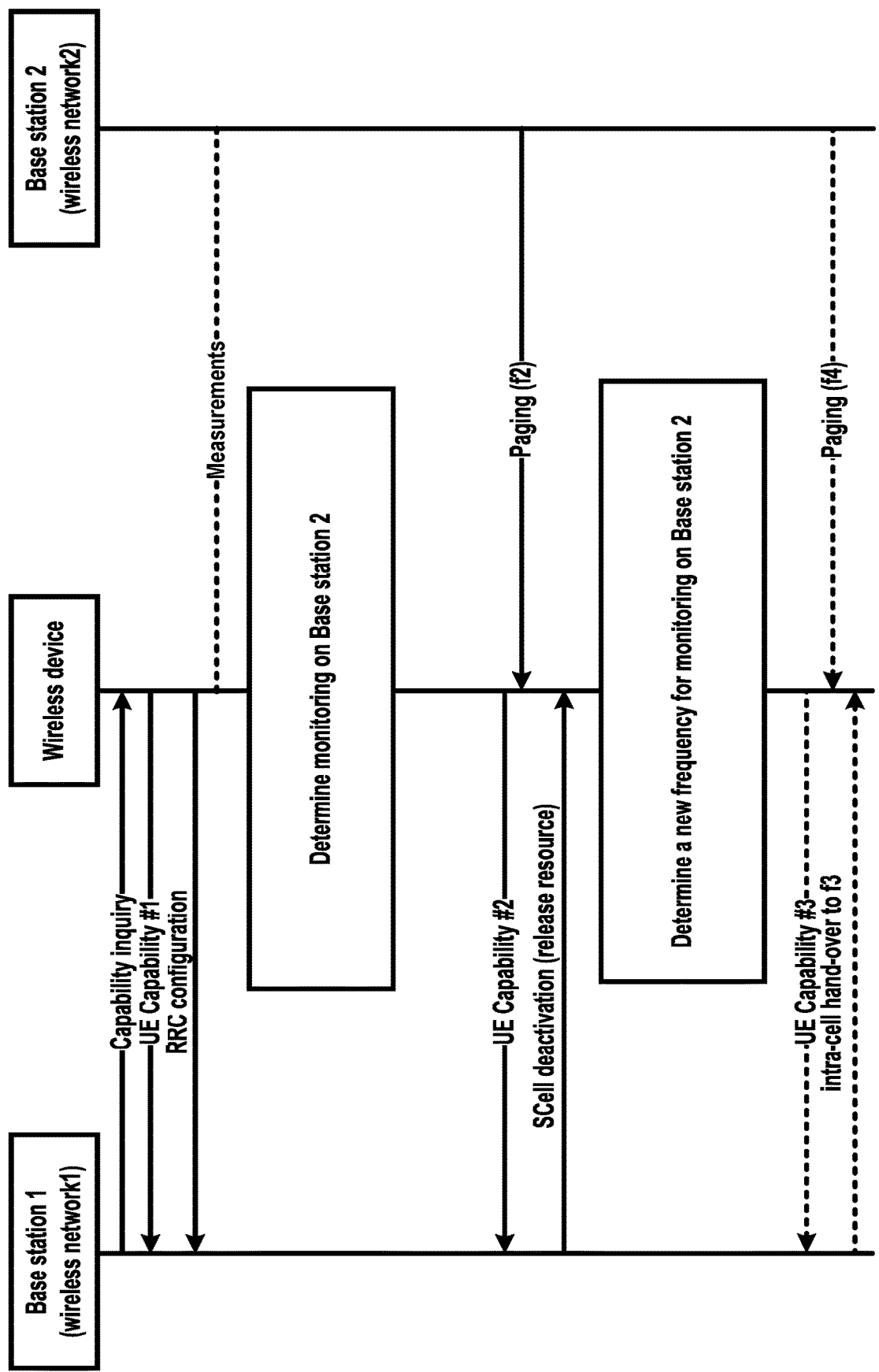
FIG. 21 illustrates an example diagram to update one or more UE capabilities/resource availabilities in response to resource reallocation across multiple systems.

FIG. 21 illustrates an example of capability update in response to resource allocation update across multiple systems. A wireless device indicates a first UE capability (e.g., UE capability #1), to the base station 1 at a RRC configuration/setup/(re)establishment process The first UE capability may indicate that the wireless device supports a band combination of 'band 1', 'band 2', 'band 1+band 2' and 'band 1+band 1'. The wireless device receives one or more RRC configuration configuring CC1 (PCell) with a center frequency of f1, and CC2 (SCell) with a center frequency of f3 from the base station 1. The wireless device detects base station 2 (e.g., a second system) and decides that the wireless device may monitor or camp-on for base station 2. Based on the RF resources, the wireless device decides that it uses a RF2 (e.g., second transceiver, second RF) to camp-on for base station 2 with a center frequency of f3. Based on RF2 being used for the second system, the wireless device updates its capability (e.g., UE capability #2) for the base station 1 to indicate for example supporting 'band 1' and 'band 1+band 1'. The wireless device may indicate that 'band 2' and 'band 1+band 2' combinations may not be supported or suggested to be deprioritized for the base station 1. The wireless device may start monitoring on a paging on frequency f2 from base station 2 (e.g., a second system) in response to the resource adaptation across multiple systems.

The wireless device may receive a de-configuration RRC message on CC2 from base station 1 in response to updating UE Capability #2. A wireless device may deactivate CC2 after sending the capability update without explicit indication from the first network. The wireless device may monitor a paging from base station 2 using the second RF. With a mobility and/or condition change, the wireless device determines that a best cell for base station 2 or the second system is changed from a frequency f2 to f4 where the wireless device may operate f4 using a first RF instead of the second RF. The first RF may be allocated the PCell (CC1) by the base station 1. The wireless device may decide to switch to f4 from f2 for base station 2 and update its capability accordingly. The wireless device may determine to utilize the first RF operating f1 to switch to f4. The wireless device may update its capability supporting 'band 2' only (e.g., UE capability #3), wherein the wireless device may not support the band of the PCell any longer for the base station 1. The first base station (e.g., base station 1) may initiate intra-cell hand-over for the wireless device in response to UE capability #3 as PCell frequency may not be available to the wireless device.

The wireless device, based on an example of FIG. 21, may not be allowed to indicate UE capability #3 as f1 is used for PCell (e.g., CC1) for the first base station or the first system. The wireless device may not indicate to disable or no support of a band combination of a band where PCell, PSCell or PUCCH SCell is configured. For example, when the wireless device is configured with a PCell of frequency f1 in band 1, the wireless device may not be allowed to indicate that the wireless device does not support band 1 as a band combination. When the wireless device may not support band 1, the wireless device may need to be reconfigured to change a primary cell, which may lead to a large service interruption time for the wireless device. The wireless device, in FIG. 21, may not be able to switch a camp-on frequency from f3 to f4 in base station 2 as f4 may require disabling of PCell band in the first system. Alternatively, the wireless device may perform 'intra-cell' hand-over to switch a PCell frequency (e.g., from f1 to f3) before updating its capability to disable f1 band (e.g., band 1) to switch camp-on frequency in the second system. A similar procedure is applied to a case of PSCell or PUCCH SCell.

In an example, a wireless device may send a set of UE capability information to a base station in response to a command from the base station to the wireless device indicating UE capability enquiry. The wireless device may send a set of UE capabilities comprising physical layer parameters, duplexing related parameters, RF related parameters. RF parameters may comprise a list of supportedBand, a list of supportedBandCombination, a list of appliedFrequencyBandListFilter, and/or srs-SwitchingimeRequestedId. In an example, a list of supportedB and is referred as a list of supportedBandCombination or as a list of band combinations where a band combination has a single band entry. In an example, a list of supportedBandCombination is referred as a list of band combination. In an example, a band combination may comprise a single band, a pair of a single band (e.g., {band1, band1} implying a intra-band combination), one or more combinations of a single band (e.g., more than two carriers in a single band), a combination of one or more bands where a combination may include more than one entry of a band. The wireless device may respond a message comprising a first set of band combinations in response to the command indicating UE capability enquiry. In an example, the wireless device may send a list of band combination supported for a specific radio access technology (e.g., NR, LTE) and/or a combination of one or more radio access technologies (e.g., EN-DC with LTE master cell group, NE-DC with NR master cell group).

In an example, a list of band combination may comprise a list of one or more band combination. A band combination may comprise one, two, three, . . . . , up to maximumPairs (e.g., 32) of bands where each band comprise one or more parameters related to the band. A band combination may comprise one or more of the followings: a band list (1 . . . maximumPairs) of bands, featureSetCombination, ca-Parameter-LTE, ca-ParameterNR, mrdc-Parameters, supportedBandwidthCombinationSet, or powerClass. In an example, featureSetCombination may comprise one or more of feature set for a band, where a feature set for a band may comprise downlink related features and/or uplink related features. Features may comprise maximum TBS, monitoring capabilities, numerologies, etc.

In an example, a wireless device may send a second list of band combination or a set of second capabilities (e.g., a second set of supportedBand, a second set of supportedBandCombination). In the example, a wireless device may send the second list of UE capability without receiving a command from a base station on the capability inquiry.

In an example, a wireless device may send a list of a second FreqBandList (e.g., FreqBandInformationEURA, FreqBandInformationNR) instead of sending a second UE capability or a second set of supported band combinations. In an example FreqBandList may include a list of FrequenyBandInformation, where FrequencyBandInformation is either FrequencyBandInformation for EUTRA or FrequencyBandInformation for NR. A each FrequencyBandInformation may comprise a bandIndicator (e.g., band index or band information), maxBandwidth for downlink, maxBandwidth for UL, maxCarrier for DL, or maxCarrier for UL. In the example, FreqBandList may be used by a base station to indicate a list of frequency band of interests. In an example, a wireless device may utilize the same format/information element to send an update in a frequency band. For example, a wireless device may indicate a reduced maxBandwidth for downlink for one or more frequency bands (e.g., from 100 MHz to 0 MHz to indicate no support on that band).

In an example, a wireless device may send a second list of supportedBand where a supportedB and includes a band index or bandIndicator or a band information to inform the change of resource allocation. For example, a wireless device may send a list of bands that the wireless device may support based on the current resource allocation. In response to a change of resource allocation, the wireless device may inform one or more bands are not supported or the updated list of supported bands. In receiving an updated band list, a first base station may assume that one or band combinations including one or more bands not supported by the UE are not supported any more.

Figure 22:
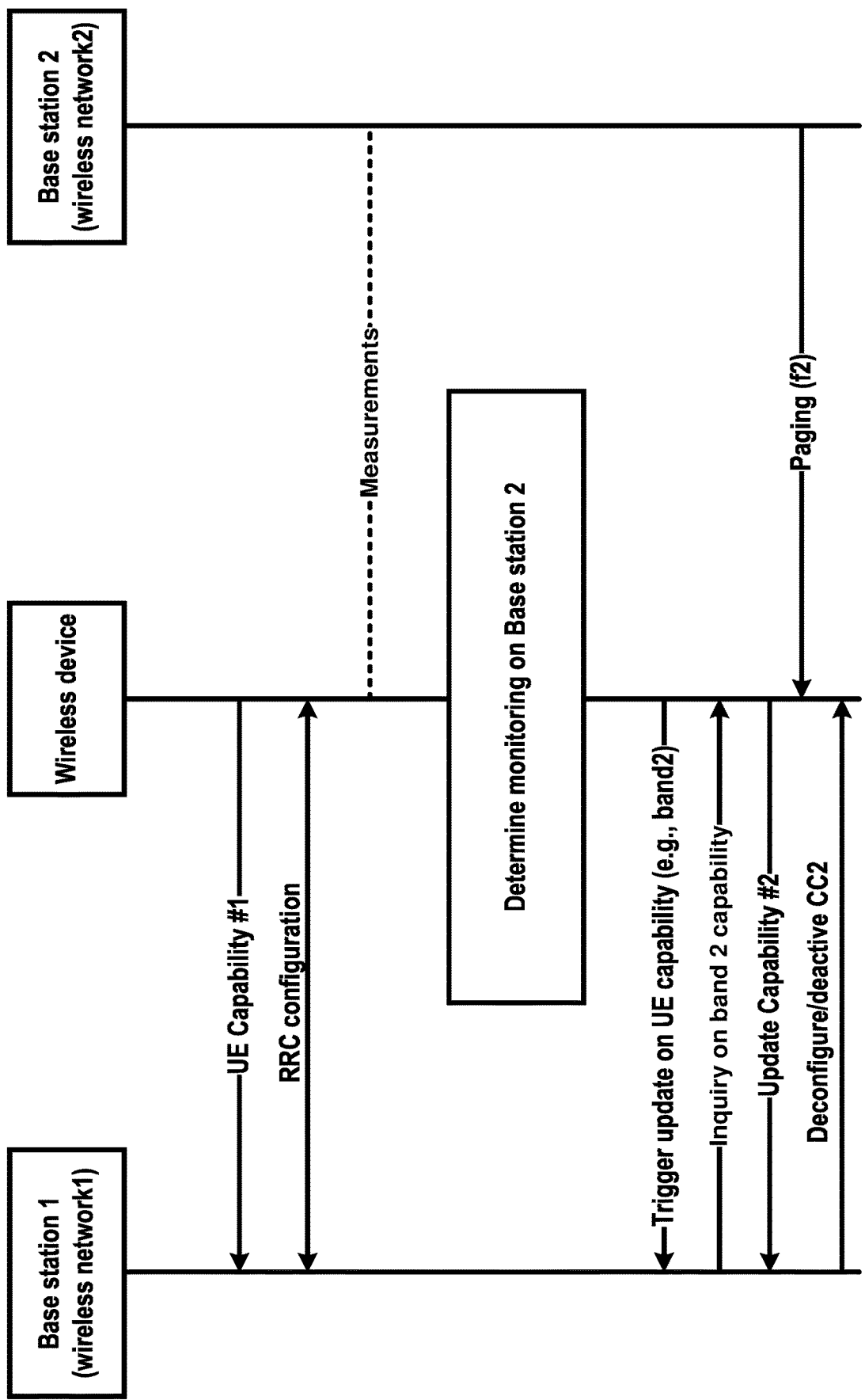
FIG. 22 illustrates an example diagram to update one or more UE capabilities/resource availabilities in response to resource reallocation across multiple systems.

In an example, a wireless device may inform (e.g., send one or more RRC messages) to a first base station a list of impacted bands after the wireless device may reallocate one or more radio transceivers to a second system. The first base station may request updates on the capability including the list of impacted bands to update the list of capabilities. FIG. 22 illustrates an example. The wireless device may indicate a first UE capability (UE capability #1) at RRC connection setup procedure of supported band of band 1 and band 2, and a supported band combination of band 1 and band 2 to the base station 1. The wireless device may send the related UE capabilities related to the supported band and band combination lists. Based on the configuration, a first base station (the base station 1) may configure a CC1 (in band 1) and a CC2 (in band 2). The wireless device may detect a presence of a base station 2 based on some measurements, and decide to camp-on the base station 2 (e.g., the second system) where the camp-on frequency for the base station 2 is f2 using the second RF (e.g., RF2). With allocating RF2 to the second system, the wireless device may not be able to support band 2 for the base station 1 any longer. The wireless device may inform the impacted band list (e.g., band 2) to the base station 1 after determining a new resource partitioning across multiple systems.

The first base station may send an inquiry on UE capability including band 2 information. The first base station may not send an inquiry if the base station may not have a plan to operate on the impact bands. In response to the inquiry, the wireless device may resend an updated capability list (e.g., Capability #2) or a subset of UE capabilities (e.g., a supported featureSet or frequency list, and/or the like). The first base station may deconfigure or deactivate CC2 corresponding to the one or more impacted bands as the performance may not be guaranteed. For example, the first base station may send a deactivation message via MAC CEs and/or DCIs and may send a deconfiguration message via an RRCs or MAC CEs and/or DCIs. In responding to the UE capability inquiry other than in RRC connection setup procedure, a wireless device may send one or more gap patterns that the wireless device is needed for a band or a band combination to support other systems in the band or band combination.

For example, a wireless device may send information about 'start time', 'duration' of unavailable time of its resources in one or more bands or one or more band combinations which are impacted from the resource reallocation across multiple systems. In an example, a wireless device may send an indication to request 'capability update'. The wireless device may indicate 'update capability' (e.g., a single bit trigger, a trigger embedded with PHR, a trigger embedded with an RRC message, a MAC CE, etc.) without including detailed information. The base station 1 may send a capability inquiry message in response to the trigger. The wireless device may send a list of impacted bands/frequencies where each band/frequency may indicate at least one of: not support as a PCell or PSCell, not support as an active SCell, not support for a cell configuration, or not support for a measurement. 'Not support as a PCell or PSCell' may indicate that the wireless device may not accept handover or SCG configuration on the band or frequency. 'Not support as an active SCell' may indicate that the wireless device may not support one or more active SCells in the band or the frequency. 'Not support for a cell configuration' may refer that the wireless device may not support one or more cells are configured in the band or the frequency. 'Not support for a measurement' may refer that the wireless device may not support an RRM measurement or other measurement(s) in the band or the frequency.

Figure 23:
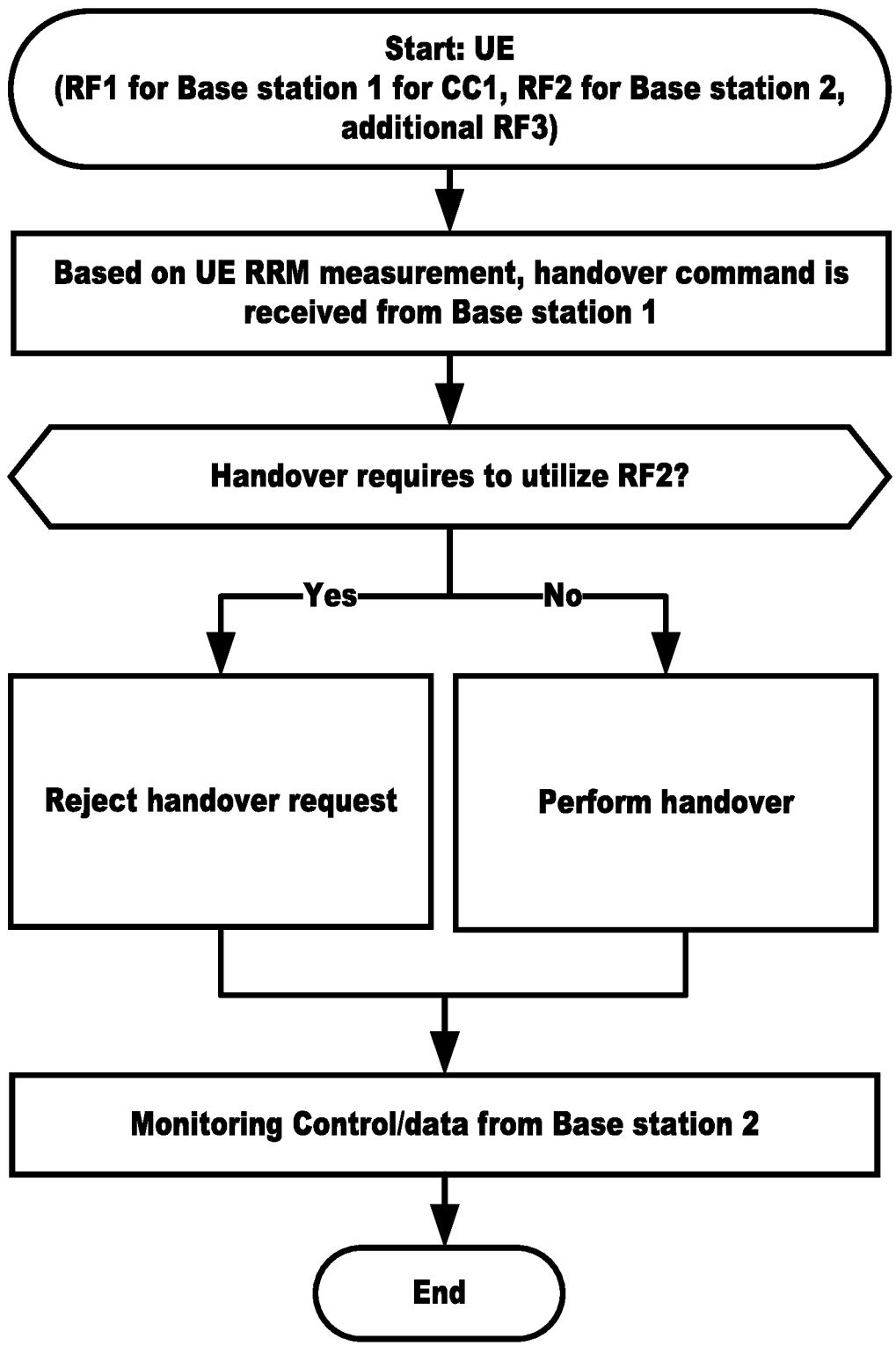
FIG. 23 illustrates a flow chart that a wireless device may perform in response to a handover request as per of an aspect of an example embodiment of the present disclosure.

In an example, a wireless device may receive a hand-over request which may require reallocation of its resources. The wireless device may reject the hand-over request (e.g., via one or more RRC messages comprising a rejection command and one or more rejection causes) in case the reallocation of the resources may lead one or more disconnections or loosing monitoring capabilities across multiple systems. FIG. 23 illustrates an example. For example, a wireless device may have RF1, RF2 and RF3 for RX chains. For example, RF1 is under use for the base station 1 for a first cell (CC1), and RF2 is under use for the base station 2 for monitoring paging, and RF3 are available for the measurement supporting both the first and second system. The wireless device may perform a measurement for the base station 1 utilizing RF1 and/or RF2. The wireless device may receive a hand-over command to switch to a frequency of f2 where the wireless device may support f2 based on the second RF (e.g., RF2) where RF2 is under use for the second system. The wireless device may reject the hand-over command in response to the need of RF2 on the first system as RF2 is being used for the second system. Alternatively, the wireless device may switch a frequency for the base station 2 (e.g., a second system) for camping-on such that the wireless device may release the use of RF2 from the second system. In response to a successful switching of a switching at the second system and releasing the second RF (e.g., RF2) from the base station 2, the wireless device may accept the hand-over command and perform hand-over procedure.

In an example, the wireless device may keep the monitoring on gNB2 regardless of hand-over procedure in the first system. If the wireless device may change the camp-on frequency on gNB2, hand-over operation in the first system may be performed. If the wireless device may keep on the camp-on frequency or servicing frequency at the second system, the wireless device may reject the hand-over command. In response to rejecting a hand-over, a wireless device may respond (e.g., via such as RRC messages) with a reason of the rejection and/or one or more alternative frequencies for the hand-over. For example, a reason for the rejection of a hand-over command may include 'RF being occupied', 'a band combination is not supported', 'suggest a better frequency', 'not preferred', and/or the like. Depending on the reason of a rejection, corresponding recommendation may follow. For example, if 'a band combination is not supported' is indicated as a reason for the rejection, a list of supported band combinations may be indicated as well so that the first base station may be able to send another hand-over command from the supported band combinations.

In an example, when a wireless device receives a hand-over command for a first system which may require the wireless device to use one or more of RF transceivers allocated to a second system, the wireless device may respond 'acceptance' with a comment. Example comments may include 'one or more RF being shared', 'performance degradation is expected', 'suggest handover to different frequency', and/or the like. The wireless device may support the first system and the second system simultaneously where potential performance degradation at both systems or at the first system may be expected. As the wireless device needs to perform hand-over operation to maintain the connectivity, the wireless device may accept the hand-over command. The wireless device may recommend switching to different frequency to minimize performance degradation on the first system due to resource sharing across the first and the second systems. For example, a base station may configure a RRM reporting condition, wherein the condition may comprise a case where a performance of a primary serving frequency and/or a serving cell frequency may be degraded due to a resource sharing between a first system and a second system. The wireless device may trigger the RRM reporting in response to one or more RFs shared between the first system and the second system. The wireless device may also inform/report one or more frequency layers/serving cells that will be impacted by the multi-system. The wireless device may transmit one or more candidate frequency layers/cells to be switched for the impacted frequency layers/serving cells.

Figure 24:
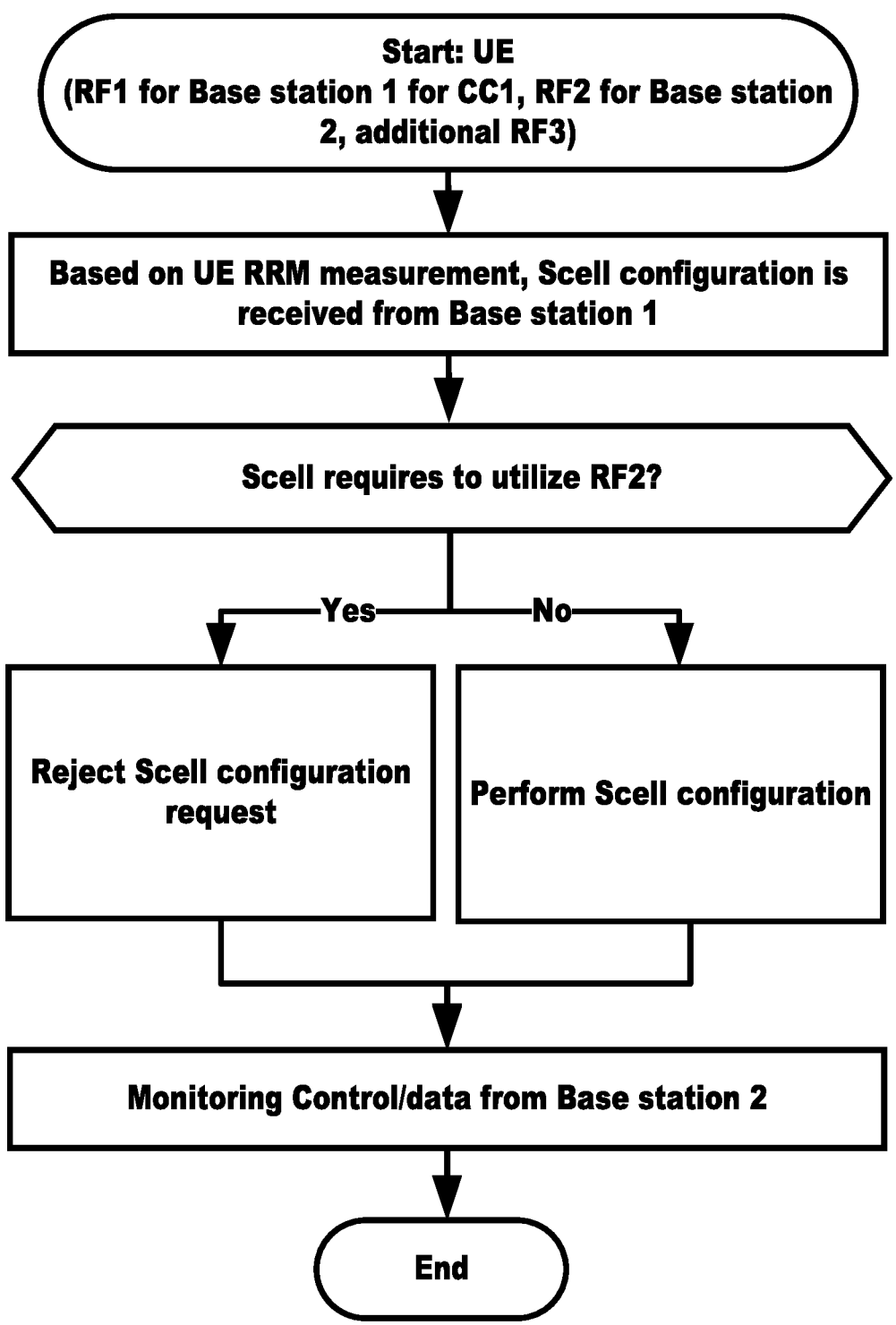
FIG. 24 is a flow chart that a wireless device may perform in response to a SCell addition as per of an aspect of an example embodiment of the present disclosure.

In an example, a wireless device may allocate one or more radio resource across multiple systems. The wireless device may not advertise or inform the resource allocation to one or more systems. The wireless device may receive one or more RRC messages from a first system (e.g., base station 1) comprising one or more SCell (secondary cell) configuration which may require reallocation of the resources or may require release of one or more radio resources allocated to a second system. The wireless device may reject a configuration of the one or more SCells (e.g., via an RRC messages comprising a rejection on one or more SCells with the list of cell IDs/indices for the one or more SCells) in case the wireless device may need to adjust resource allocations or may need to impact on the services in the second system or may need to release one or more radio resources allocated to the second system. FIG. 24 shows an example diagram of this case. A wireless device may have three RFs where a first RF is allocated to the base station 1 (e.g., a first system), a second RF is allocated to the base station 2 (e.g., a second system), and a third RF is allocated for the measurements or being available.

Based on the RRM measurement reports, conditions and UE traffic, the first system (e.g., the base station 1) may determine to add a SCell and configure the wireless device with additional SCell. The wireless device may determine whether SCell may be supported by keeping the current resource allocation (e.g., utilizing RF3 or sharing RF1). If the wireless device may need to utilize RF2 which is allocated to the second system, the wireless device may reject the configuration of SCell. The wireless device may switch a camp-on frequency or serving frequency in the base station 2 to accommodate SCell addition. For example, the wireless device may switch to a camp-on frequency utilizing RF3 in the base station 2 (e.g., the second system) so that the wireless device may accept SCell configuration. As SCell configuration is done with deactivated state, the wireless device may accept the configuration of an SCell. The wireless device may reject in response to an activation command of one or more SCells which may require resource reallocation across the multiple systems. Similar to a hand-over command, a wireless device may respond with a reason of rejection or with a recommendation in case of the rejection message.

In an example, a wireless device may receive one or more RRC messages comprising one or more measurement reporting trigger events (e.g., a measurement report triggering in case a neighbor cell quality becomes better than that of the serving cell by an offset) where the wireless device may report one or more radio resource management (RRM) reports in response to the events. A wireless device may receive RRC configurations to report periodically RRM reports. The wireless device may skip reporting of RRM results in spite of the event triggering or periodic triggering depending on one or more of the followings. The wireless device may need to reallocate radio resources across multiple systems if the first base station may trigger a hand-over request based on the RRM report. For example, if the wireless device reports an RRM result where a frequency f2 performs better than the current serving cell or PCell where the wireless device may need to release the second RF (e.g., RF2) allocated to the second system, the wireless device may not report the RRM result, as the hand-over command may not be accepted by the wireless device.

For example, a wireless device may not report RRM results on one or more frequencies which may require release of radio resources from the second systems. The wireless device may skip first RRM reporting on such cases in response to the first RRM reporting is configured with periodic reporting. The wireless device may report second RRM reporting wherein the second RRM reporting are configured with aperiodic RRM. The wireless device may report RRM results regardless of resource allocation status and may indicate 'potential poor quality' on one or more frequencies which may be impacted due to the second system. For example, the wireless device may inform the first base station that f2 may not be a good quality as RF2 is being used for the second system. In an example, a wireless device may perform one or more measurements configured from a first base station and may report RRM results based on the configuration of events and/or reporting configuration.

The wireless device may inform 'being used by another system' in one or more RRM results for one or more frequencies or measurement objects or cells or bands to indicate that the wireless device may need to share one or more resources across multiple systems if one or more cells configured/activated from the indicated one or more frequencies or measurement objects or cells or bands. The wireless device may apply a threshold or an offset value in RRM measurement for the one or more frequencies or measurement objects or cells or bands such that the RRM measurement result may be penalized. For example, for the one or more frequencies or measurement objects or cells or bands, the wireless device may measure a RSRP or a RSRQ which will be recomputed as the RSRP—the offset or the RSRQ—the offset. A separate offset for RSRP and RSRQ may be configured by a first base station. The first base station may indicate a penalty amount for a frequency/band/carrier in case the wireless device may need to share the resources with other systems. In an example, a wireless device may report 'out of range' value for the one or more frequencies or measurement objects or cells or bands.

In an example, a wireless device may skip RRM measurements on one or more frequencies for a first system which may require one or more radio transceivers allocated to a second system. The wireless device may treat the one or more radio transceivers allocated to the second system as if those are not available at all for the first system. A first base station of the first system may reconfigure one or more measurement objects to exclude the one or more frequencies in response to receiving an updated capability from the wireless device on the supported band combinations. The first system may not configure a measurement object on a frequency which is not belonging to the one or more band combinations supported by the wireless device at a given time. The wireless device may assume automatic deconfiguration of one or more measurement objects including the one or more frequencies after sending the updated capability. The wireless device may skip RRM measurement on the one or more frequencies after determining that the wireless device may not be able to measure the one or more frequencies without impacting on the second system. The wireless device may inform a list of measurement objects that the wireless device may skip measurements. The wireless device may indicate 'out of range' value for the RRM report for the frequency which is not belonging to the one or more band combinations supported by the wireless device at a given time.

Figure 25:
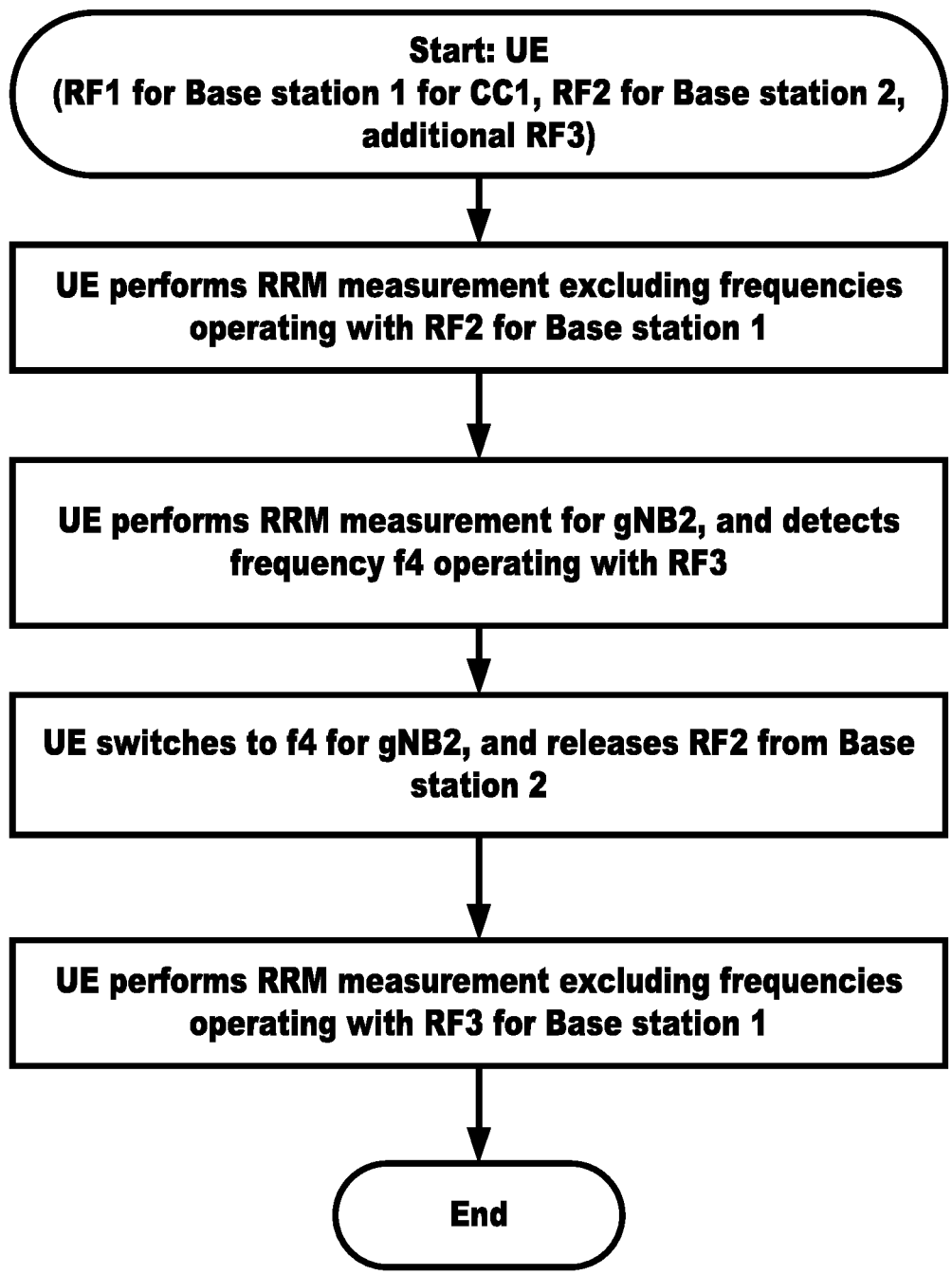
FIG. 25 illustrates a flow chart that a wireless device may perform in radio resource management measurement (RRM) as per an aspect of an example embodiment of the present disclosure.

FIG. 25 illustrates a flow diagram. A wireless device may have three RFs which are allocated to the base station 1, the base station 2 and the measurement or additional use. A wireless device may skip performing an RRM measurement on one or more frequencies where the wireless device may need to use the second RF (e.g., RF2) for the base station 1. The wireless device may discover that a frequency of f4 which may use the third RF (e.g., RF3) which may allow the release of RF2 from the base station 2. The wireless device may resume RRM measurement on the one or more frequencies using RF2. The wireless device may stop RRM measurement on the second set of frequencies based on RF3 for the base station 1 as the RF3 is being allocated to the base station 2.

Figure 26:
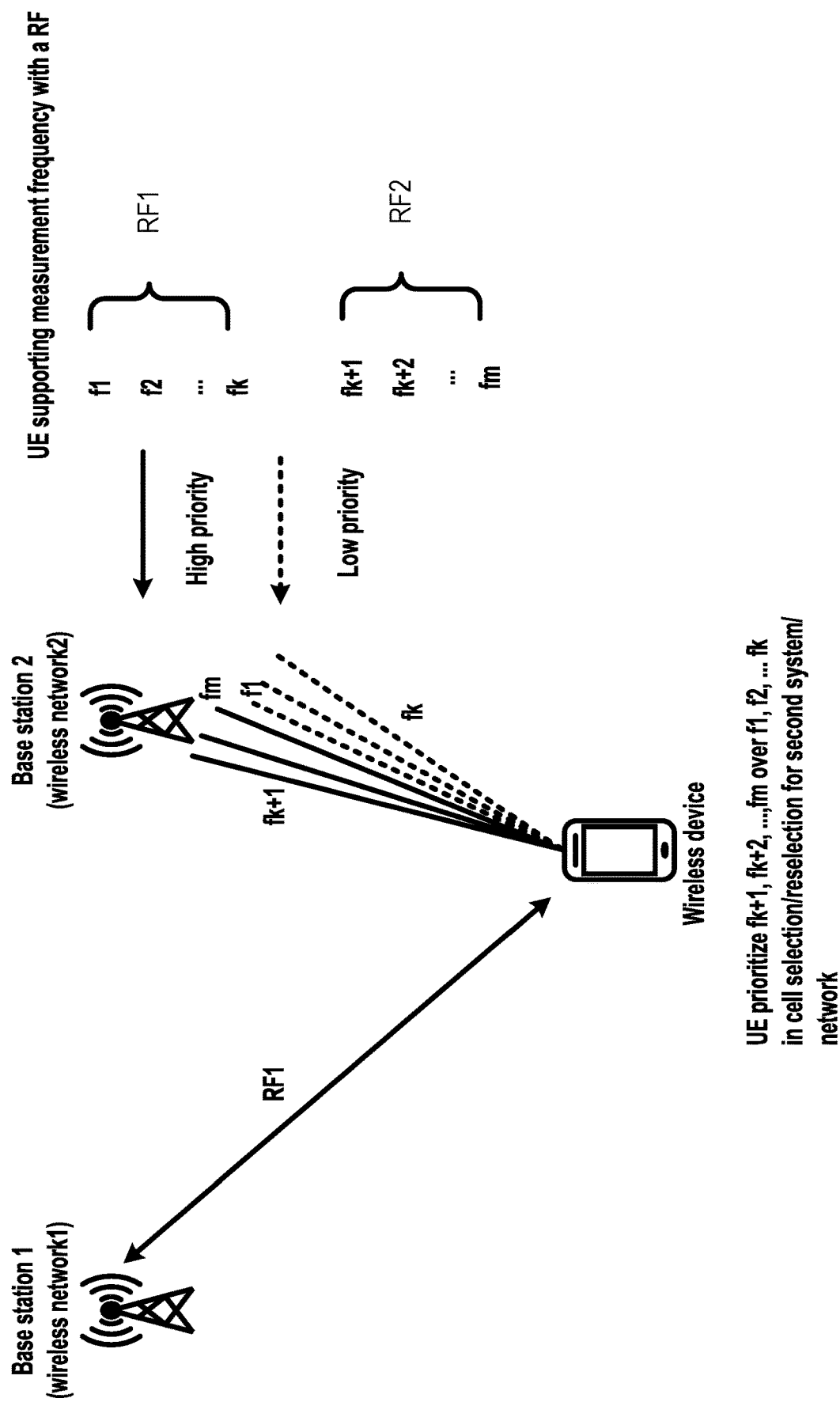
FIG. 26 illustrates an example diagram of cell selection.

In an example, a wireless device may determine one or more first bands/frequencies having higher priority over one or more second bands/frequencies in cell selection and/or cell reselection process. The wireless device may determine the one or more first bands/frequencies that the wireless device may be able to support without sharing radio resources with another system or network or base station when the wireless device camps-on on a frequency from the one or more first bands/frequencies for the second system. The wireless device may determine the one or more second bands/frequencies that the wireless device may need to share one or more radio transceivers across multiple systems if the wireless device may camp-on on a frequency from the one or more second bands/frequencies for the second system. For example, based on an example of FIG. 26, in attempting selection or reselection in a second system (e.g., the base station 2) for paging monitoring or camp-on operation, a wireless device may deprioritize one or more frequencies/bands where the wireless device may share one or more radio transceivers (e.g., RF1) as the one or more radio transceivers are being used for a first system or the first network or first base station. As shown in FIG. 26, the wireless device may camp-on a frequency where the wireless device may operate using the available radio transceiver (e.g., RF2).

In an example, a wireless device may consider a cell of a second system is not suitable in cell selection process if the cell of the second system may require one or more radio resources (e.g., radio transceivers) which are currently being used for a first system. A wireless device may not camp-on the second system if there is no suitable cell based on the procedure. A wireless device may camp-on the cell if there is no other cell suitable. A wireless device may skip measurements on the one or more second bands/frequencies in cell selection process. A wireless device may perform cell selection by leveraging stored information: the wireless device may utilize stored information of frequencies and cell parameters from previously received measurement control information elements or from previously detected cells. In performing measurements based on the stored information, the wireless device may skip measurement on the one or more second frequencies for the second system. In response to finding a suitable cell, the wireless device may camp-on the suitable cell. In response to not finding a suitable cell, the initial cell selection procedure may be performed.

In an initial cell selection process for the second system, a wireless device may scan all RF channels in the supported bands excluding the one or more second bands/frequencies for the second system based on its capabilities. In the measured frequency, the wireless device may identify the strongest cell. The wireless device may camp-on on a strongest cell of a frequency if the strong cell is a suitable cell. The wireless device may perform measurements on the one or more second bands/frequencies when there is no suitable cell identified.

In an example in cell selection procedure for the second system, a wireless device may assume Qoffset,temp is configured with a large value (e.g., 10 dB) in cell selection process. The wireless decide may perform measurements on the one or more second bands/frequencies, and may assume that Qoffset,temp is set as the large value so that the cell from the one or more second bands/frequencies may be deprioritized. The wireless device may assume to apply Qoffset,temp to a frequency from the one or more second bands/frequencies.

In an example in cell selection procedure for the second system, a wireless device may add additional offset (e.g., Qoffset,deprioritized) in determining Srxlev and/or Squal (cell selection RX level value and/or cell selection quality value respectively) for a frequency from the one or more second bands/frequencies. The additional offset may be a large value (e.g., 10 dB) to deprioritize the one or more second bands/frequencies. In determining Srxlev for the frequency, the wireless device may compute Srxlev=Qrxlevmeas−(Qrxlevmin+Qrxlevminoffset)−Pcompensation−Qoffset,temp−Qoffset,deprioritized where Qrxlevmeas may refer measured cell RX level value such as RSRP, Qrxlevmin may refer minimum required RX level in the cell, Qrxlevlminoffset may refer an offset, Pcompensation may refer necessary compensation for Pmax, and Poffset,temp may refer an offset temporarily applied. In determining Squal, a wireless device may compute Qqualmeas−(Qqualmin+Qqualminoffset)−Ooffset,temp. Qqualmeas may refer measured cell quality value such as RSRQ, Qqualmin may refer minimum required quality level in the cell, Qqualminoffset may refer an offset.

A wireless device may deprioritize the one or more second bands/frequencies in cell reselection procedure for the second system. In cell reselection procedure, a wireless device may assume that the one or more second bands/frequencies are listed as black listed cells. The wireless device may not consider any black listed cells as candidate cell reselection.

In an example, a wireless device may assume that a frequency/a cell corresponding to the one or more second bands/frequencies with lowest reselection priority regardless of UE-dedicated signaling or SIB indication on the reselection priority information on the frequency/cell. The frequency/the cell corresponding to the one or more second bands/frequencies are considered as deprioritized frequency/cell in cell reselection for the second system. A wireless device may consider a low (e.g., lowest) priority for a currently camp-on frequency/cell if the currently camp-on frequency/cell may correspond to the one or more second bands/frequencies for the second system.

In an example, a wireless device may not consider one or more cells/frequencies corresponding to the one or more second bands/frequencies as suitable cells/frequencies for the second system in reselection process. A wireless device may skip measurement on the one or more second bands/frequencies for the second system. A wireless device may apply a measurement penalty (e.g., Qoffset,deprioritized) in the measurement results (e.g., Srxlev and/or Squal) for the cell/frequency corresponding to the one or more second bands/frequencies for the second system. In an example, a wireless device may apply a second threshold value for a cell or frequency corresponding to the one or more second bands/frequencies for the second system in determining inter-frequency/inter-RAT reselection, where the cell or frequency has higher priority over the serving frequency. For example, the wireless device may apply the second threshold to determine to perform a cell reselection for a first cell belonging to the one or more second bands/frequencies if Squal (the first cell) is larger than THRESHsecond, highq. THRESHsecond,highq may be larger than THRESHx,highq where THRESHx, highq may refer a normal threshold for Squal for cell reselection. THRESHsecond may be determined based on adding an offset to THRESHx,highq. Similarly, when the first cell has lower priority, reselection to the first cell may be attempted if the serving cell quality Squal is lower than THRESHserving,lowq and Squal (the first cell) is larger than THRESHsecond,lowq where THRESHsecond, lowq is larger than THRESHx,lowq that is used for normal reselection for lower priority cells. For example, a wireless device may reselect a cell/a frequency from the one or more second bands/frequencies for the second system, when the quality of the cell/the frequency is better with additional offset compared to the serving cell/frequency.

A wireless device may recommend one or more parameters related to cell reselection to a first system or a second system considering a resource allocation across multiple systems. For example, a wireless device may recommend lower priority to one or more frequencies of the first system where the wireless device may need to share one or more radio resources to support the one or more frequencies across multiple systems. A wireless device may recommend one or more values (e.g., Qoffset between two cells, Qoffset for a certain frequency, Qoffset,temp, Qqualminoffsetcell, THRESHx,highq, THRESHx,lowq, THRESHserving,lowp, THRESHserving,lowq, and/or the like) for cell reselection for a frequency corresponding to the one or more frequencies for the first system. Similar approach may be considered for the second system. A wireless device may receive one or more messages comprising Qoffset, deprioritized, THRESHsecond,highq, THRESHsecond,lowq, and/or the like. The wireless device may receive the messages of configuration parameters for a frequency or a cell or for a UE.

FIG. 26 illustrates an example of cell selection or reselection prioritization. For example, a wireless device connects to the base station 1 (e.g., wireless network 1) using RF1 actively. In cell selection or reselection procedure for the base station 2 (e.g., wireless network 2), the wireless device may put lower priority on one or more frequencies which need RF1 to operate where RF1 is being occupied for the base station 1. In the example, the wireless device may put higher priority over frequency fk+1, fk+2, . . . fm over f1, f2, . . . , fk for the base station 2 based on its resource availability/allocation across multiple systems. The wireless device may put lower priority on f1, f2, . . . , fk, or add on offset in measurement results to add a penalty or assume cells from f1, f2, . . . , fk are barred.

Embodiments may be also applicable to a single system with one or more transmission points or with one or more gNBs associated with the wireless device or a single system with dual connectivity and/or the like.

A wireless device may send to a first base station at least one first radio resource control (RRC) message indicating one or more first band combinations that the wireless device is capable of communicating with the first base station. The wireless device may select a first cell of a second base station for monitoring one or more paging channel. The wireless device may determine one or more second band combinations based on the operating frequencies of the first cell, the one or more first band combinations and the radio transceiver capability of the wireless device. The wireless device may transmit to the first base station at least one second RRC message indicating the one or more second band combinations.

The wireless device may recommend that the one or more second band combinations are deprioritized for the first base station in configuring one or more carriers/cells from the first base station.

The wireless device may determine the one or more second band combination based on one or more radio transceiver capabilities and the first cell for the second base station. The wireless device may determine the one or more second band combinations where the wireless device may need to share or release one or more radio transceivers used for supporting the first cell for the second base station.

The wireless device may use the same RF to support a frequency from the one or more second band combinations for the first system to the RF used for the first cell of the second system.

The one or more first band combination or the one or more second band combination may comprise at least one of a single band a pair of a same band, two or more of a same band or one or more bands.

The first base station may belong to a first network comprising at least one of a first public land mobile network (PLMN), a first radio access system (e.g., cellular, Wi-Fi, V2X, Wave), or a first radio access technology (e.g., 5G, LTE, 3G, 2G).

The second base station may belong to a second network comprising at least one of a second public land mobile network (PLMN), a second radio access system (e.g., cellular, Wi-Fi, V2X, Wave), or a second radio access technology (e.g., 5G, LTE, 3G, 2G).

A wireless device may receive from a first station at least one radio resource control messages comprising cell configuration parameters for one or more first cells. The wireless device may receive from a second base station at least one radio resource control messages comprising cell configuration parameters for one or more second cells. The wireless device may send a feedback to the second base station. The feedback may comprise a confirmation indication comprising an acknowledgement or a rejection of the configuration parameters. The wireless device may send the confirmation with the rejection in case the wireless device may operate a same set of one or more RF chains or radio transceivers across the one or more first cells and the one or more second cells.

A wireless device may receive from a first station at least one radio resource control messages comprising cell configuration parameters for one or more first cells. The wireless device may send to a second base station at least one radio resource control message comprising a band and/or a band combination list. The band and/or band combination list may comprise a set of bands and/or band combinations that the wireless device may stop supporting. The wireless device may stop supporting one or more second cells to be configured from the band and/or the band combinations. The wireless device may determine the list of the band and/or the band combination where the wireless device may use a same set of RF chains or radio transceivers to support the one or more first cells for the first base station and the one or more second cells for the second base station (if configured).

The wireless device may receive from a second base station at least one radio resource control messages comprising cell configuration parameters for one or more second cells. The wireless device may send a feedback to the second base station. The feedback may comprise a confirmation indication comprising an acknowledgement or a rejection of the configuration parameters. The wireless device may send the confirmation with the rejection in case the wireless device may operate a same set of one or more RF chains or radio transceivers across the one or more first cells and the one or more second cells.

A wireless device may send to a first base station at least one first radio resource control (RRC) message indicating one or more first band combinations that the wireless device is capable of communicating with the first base station. The wireless device may select a first cell of a second base station for monitoring one or more paging channel. The wireless device may determine one or more impacted bands based on the operating frequencies of the first cell, resources such as RF chains or radio transceivers of the wireless device. The wireless device may transmit to the first base station at least one second RRC message indicating the one or more impacted bands. The wireless device may transmit one or more second band combination or second UE capabilities in response to a command indicating updating of a UE capability from the first base station.

A wireless device may receive from a first base station of a first system at least one first radio resource control messages. The first radio resource control messages may comprise cell connection parameters comprising one or more first cells configured to the wireless system for the first system. The wireless device may receive from a second base station of a second system at least one second radio control resource message. The second radio control resource message may comprise a first cell reselection parameter and a second cell reselection parameter for one or more cells/frequencies. The wireless device may apply the first parameter for a second cell when the wireless device shares one or more radio transceivers between the second cell of the second system and the one or more first cells of the first system. The wireless device may apply the first parameter in other cases.

A wireless device may receive from a first base station at least one first radio resource control messages. The first radio resource control messages may comprise cell configuration parameters for one or more first cells. The wireless device may receive from a second base station at least one second radio resource control messages. The second radio resource control messages may comprise measurement objects and reporting configurations related to radio resource management (RRM) for one or more second frequencies. The wireless device may determine a first set of measurement objects from the indicated measurement objects from the second radio resource control messages and may skip the RRM measurements on one or more second frequencies corresponding to the first set of measurement objects. The wireless device may determine the first set of measurement objects where the wireless device may operate using a same radio transceivers or RF chains on the o one or more first cells and the one or more second frequencies.

A wireless device may send to a first base station at least one first radio resource control (RRC) message indicating one or more first band combinations that the wireless device is capable of communicating with the first base station. The wireless device may select a first cell of a second base station for monitoring a downlink control information. The wireless device may determine one or more second band combinations based on the operating frequencies of the first cell, the one or more first band combinations and the radio transceiver capability of the wireless device. The wireless device may transmit to the first base station at least one second RRC message indicating the update on a UE resource availability for the first base station.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 27 is a flow diagram as per an aspect of an example embodiment of the present disclosure. At 2710, a wireless device may send a first radio resource control (RRC) message to a first base station. The first RRC message may indicate one or more first frequency band combinations that the wireless device is capable of communicating with the first base station. At 2720, during an RRC connection with the first base station, a cell of a second base station for monitoring one or more downlink channels may be selected. At 2730, one or more second frequency band combinations may be determined based on: one or more operating frequency bands of the cell; the one or more first frequency band combinations; and radio transceiver capability of the wireless device. At 2740, during the RRC connection with the first base station, a second RRC message indicating the one or more second frequency band combinations may be transmitted to the first base station.

According to an example embodiment, the one or more first frequency band combinations may comprise the one or more second band combinations. According to an example embodiment, the one or more second band combinations to assist prioritization of serving cell configurations by the first base station to the wireless device may be determined. The wireless device may request to deprioritize the one or more second band combinations. According to an example embodiment, the wireless device may use the same radio frequency (RF) chain(s) between one or more cells of the first base station and the cell of the second base station. The one or more cells of the first base station may operate in the one or more second band combinations.

According to an example embodiment, the one or more operating frequency bands of the cell may be determined. The wireless device may use the same RF chain(s) between one or more second cells of the first base station and the cell of the second base station. The one or more second cells of the first base station may operate in the one or more operating frequency bands. According to an example embodiment, the first base station deprioritizes one or more third frequency bands combinations for configuration of one or more serving cells for the wireless device, wherein the one or more first frequency bands combinations comprise the one or more third frequency bands combinations and the one or more second frequency bands combinations do not comprise the one or more third frequency bands combinations. According to an example embodiment, the first base station may deactivate one or more serving cells. The one or more serving cells may operate on the one or more third frequency bands combinations. According to an example embodiment, the first base station may release configurations of the one or more serving cells.

According to an example embodiment, a frequency band combination may of one of the one or more first frequency band combination and one or more second frequency band combination may comprise a frequency band. A frequency band combination may of one of the one or more first frequency band combination and one or more second frequency band combination may comprise a pair of frequency bands. A frequency band combination may of one of the one or more first frequency band combination and one or more second frequency band combination may comprise two or more frequency bands. A frequency band combination may of one of the one or more first frequency band combination and one or more second frequency band combination may comprise one or more frequency bands. According to an example embodiment, the first base station may belong to a first public land mobile network (PLMN). According to an example embodiment, the second base station may belong to the first PLMN or a second PLMN.

According to an example embodiment, the one or more downlink channels may be transmitted at least for paging indication from the second base station.

According to an example embodiment, the one or more second frequency bands combinations may be determined. The wireless device may support the one or more second frequency bands combinations for the first base station while the wireless device monitors the one or more downlink channels via the cell of the second base station. According to an example embodiment, a determination of the one or more second frequency band combinations may be made based on the one or more operating frequency bands of the cell. A determination of the one or more second frequency band combinations may be made based on the one or more first frequency band combinations. A determination of the one or more second frequency band combinations may be made based on the radio transceiver capability of the wireless device. A determination of the one or more second frequency band combinations may be made based on one or more first operating frequency bands of a primary cell of the first base station.

According to an example embodiment, the wireless device may receive a third RRC message from the first base station. The third RRC message may indicate release of one or more secondary cells of the first base station based on the one or more second frequency band combinations.

According to an example embodiment, the one or more downlink channels may be monitored via the cell of the second base station.

According to an example embodiment, the first base station may use a first radio access technology and the second base station may use a second radio access technology. According to an example embodiment, the first radio access technology may be new radio (NR). According to an example embodiment, the second radio access technology may be NR or LTE.

According to an example embodiment, the one or more downlink channels may comprise one or more control channels and data channels to receive the paging indication from the second base station. According to an example embodiment, the radio transceiver capability may comprise one or more RF chains equipped with the wireless device. According to an example embodiment, the radio transceiver capability may comprise baseband processing capabilities of the wireless device.

According to an example embodiment, a wireless device may send to a first base station a first radio resource control (RRC) message indicating one or more first frequency band combinations that the wireless device is capable of communicating with the first base station. The wireless device may select a second cell of a second base station for monitoring one or more downlink channels. One or more second frequency band combinations may be determined based on one or more first operating frequency bands of the first cell; one or more operating frequency bands of the second cell; the one or more first frequency band combinations; and radio transceiver capability of the wireless device. The wireless device may transmit to the first base station a third RRC message indicating the one or more second frequency band combinations.

According to an example embodiment, a wireless device may send to a first base station a first radio resource control (RRC) message indicating one or more first frequency band combinations that the wireless device is capable of communicating with the first base station. The wireless device may receive from the first base station a second RRC message comprising configuration parameters of one or more secondary cells. The wireless device may select a cell of a second base station for monitoring one or more downlink channels. One or more second frequency band combinations may be determined based on one or more operating frequency bands of the cell; the one or more first frequency band combinations; and radio transceiver capability of the wireless device. The wireless device may transmit to the first base station, during the RRC connection with the first base station, a third RRC message indicating the one or more second frequency band combinations. The wireless device may receive from the first base station, a fourth RRC message indicating releasing one or more secondary cells based on the one or more second frequency band combinations.

According to an example embodiment, a wireless device may receive, from a first base station of a first network, at least one first radio resource control messages comprising parameters of a first cell as a serving cell. The wireless device may receive, from a second base station of a second network, at least one second radio resource control message comprising thresholds for a cell reselection process. The wireless device may select a threshold from the thresholds based on the first cell for communicating with the first base station; a second cell for communicating with the second base station; and a transceiver capability of the wireless device. The wireless device may determine to reselect the second cell as a camp-on cell based on the threshold.

According to an example embodiment, a wireless device may receive, from a first base station, at least one first radio resource control (RRC) messages comprising first cell configuration parameters for one or more first cells. The wireless device may receive, from a second base station, at least one second RRC messages comprising second cell configuration parameters for one or more second cells. The wireless device may determine whether to accept or reject the one or more second cells based on one or more first operating frequency bands of the one or more first cells; one or more second operating frequency bands of the one or more second cells; and radio transceiver capability of the wireless device. The wireless device may send a feedback to the second base station. The feedback may indicate either an acknowledgement to confirm that the one or more second cells are configured successfully or a rejection to indicate that the one or more second cells are not configured successfully. Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more (or at least one) message(s) comprise a plurality of parameters, it implies that a parameter in the plurality of parameters is in at least one of the one or more messages, but does not have to be in each of the one or more messages. In an example embodiment, when one or more (or at least one) message(s) indicate a value, event and/or condition, it implies that the value, event and/or condition is indicated by at least one of the one or more messages, but does not have to be indicated by each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail may be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
sending, by a wireless device to a first base station, a first radio resource control (RRC) message indicating one or more first frequency band combinations, of the first base station, that the wireless device is capable of communicating with the first base station;
selecting, during an RRC connection with the first base station, a cell of a second base station for monitoring one or more downlink channels, wherein the cell operates within one or more operating frequency bands of the second base station;
determining one or more second frequency band combinations of the first base station based on:
the one or more operating frequency bands of the cell of the second base station;
the one or more first frequency band combinations; and
radio transceiver capability of the wireless device; and
transmitting, to the first base station during the RRC connection with the first base station, a second RRC message indicating the one or more second frequency band combinations.

2. The method of claim 1, wherein the one or more first frequency band combinations comprise the one or more second frequency band combinations.

3. The method of claim 1, further comprising determining the one or more operating frequency bands of the cell, wherein:
the wireless device uses same RF chain(s) between one or more second cells of the first base station and the cell of the second base station; and
the one or more second cells of the first base station operate in the one or more operating frequency bands.

4. The method of claim 1, wherein a frequency band combination of one of the one or more first frequency band combination and one or more second frequency band combination comprises at least one of:
a frequency band;
a pair of frequency bands;
two or more frequency bands; or
one or more frequency bands.

5. The method of claim 1, wherein the first base station belongs to a first public land mobile network (PLMN).

6. The method of claim 5, wherein the second base station belongs to the first PLMN or a second PLMN.

7. The method of claim 1, wherein the one or more downlink channels are transmitted at least for paging indication from the second base station.

8. The method of claim 1, further comprising determining the one or more second frequency bands combinations, wherein the wireless device supports the one or more second frequency bands combinations for the first base station while the wireless device monitors the one or more downlink channels via the cell of the second base station.

9. The method of claim 1, further comprising determining the one or more second frequency band combinations based on:
the one or more operating frequency bands of the cell;
the one or more first frequency band combinations;
the radio transceiver capability of the wireless device; and
one or more first operating frequency bands of a primary cell of the first base station.

10. The method of claim 1, further comprising receiving, by the wireless device from the first base station, a third RRC message indicating release of configuration parameters for one or more secondary cells of the first base station based on the one or more second frequency band combinations.

11. A wireless device comprising:
one or more processors; and
memory storing instructions that, when executed by the one or more processors, cause the wireless device to:
send, to a first base station, a first radio resource control (RRC) message indicating one or more first frequency band combinations, of the first base station, that the wireless device is capable of communicating with the first base station;
select, during an RRC connection with the first base station, a cell of a second base station for monitoring one or more downlink channels, wherein the cell operates within one or more operating frequency bands of the second base station;
determine one or more second frequency band combinations of the first base station based on:
the one or more operating frequency bands of the cell of the second base station;
the one or more first frequency band combinations; and
radio transceiver capability of the wireless device; and
transmit, to the first base station during the RRC connection with the first base station, a second RRC message indicating the one or more second frequency band combinations.

12. The wireless device of claim 11, wherein the one or more first frequency band combinations comprise the one or more second frequency band combinations.

13. The wireless device of claim 11, wherein the instructions, when executed by the one or more processors, further cause the wireless device to determine the one or more operating frequency bands of the cell, wherein:
the wireless device uses same RF chain(s) between one or more second cells of the first base station and the cell of the second base station; and
the one or more second cells of the first base station operate in the one or more operating frequency bands.

14. The wireless device of claim 11, wherein a frequency band combination of one of the one or more first frequency band combination and one or more second frequency band combination comprises at least one of:
a frequency band;
a pair of frequency bands;
two or more frequency bands; or
one or more frequency bands.

15. The wireless device of claim 11, wherein the first base station belongs to a first public land mobile network (PLMN).

16. The wireless device of claim 11, wherein the one or more downlink channels are transmitted at least for paging indication from the second base station.

17. The wireless device of claim 11, wherein the instructions, when executed by the one or more processors, further cause the wireless device to determine the one or more second frequency bands combinations, wherein the wireless device supports the one or more second frequency bands combinations for the first base station while the wireless device monitors the one or more downlink channels via the cell of the second base station.

18. The wireless device of claim 11, wherein the instructions, when executed by the one or more processors, further cause the wireless device to determine the one or more second frequency band combinations based on:
the one or more operating frequency bands of the cell;
the one or more first frequency band combinations;
the radio transceiver capability of the wireless device; and
one or more first operating frequency bands of a primary cell of the first base station.

19. The wireless device of claim 11, wherein the instructions, when executed by the one or more processors, further cause the wireless device to receive, by the wireless device from the first base station, a third RRC message indicating release of configuration parameters for one or more secondary cells of the first base station based on the one or more second frequency band combinations.

20. A system comprising:
a first base station;
a second base station and
a wireless device comprising:
one or more processors; and
memory storing instructions that, when executed by the one or more processors, cause the wireless device to:
send, to the first base station, a first radio resource control (RRC) message indicating one or more first frequency band combinations, of the first base station, that the wireless device is capable of communicating with the first base station;
select, during an RRC connection with the first base station, a cell of the second base station for monitoring one or more downlink channels, wherein the cell operates within one or more operating frequency bands of the second base station;
determine one or more second frequency band combinations of the first base station based on:
  the one or more operating frequency bands of the cell of the second base station;
  the one or more first frequency band combinations; and
  radio transceiver capability of the wireless device; and
transmit, to the first base station during the RRC connection with the first base station, a second RRC message indicating the one or more second frequency band combinations.

\* \* \* \* \*